US012673311B2

(12) United States Patent
Keh et al.

(10) Patent No.: US 12,673,311 B2
(45) Date of Patent: Jul. 7, 2026

(54) AMINE-FUNCTIONALIZED CELLULOSE POLYMERS FOR $CO_2$ CAPTURE

(71) Applicant: The Hong Kong Research Institute of Textiles and Apparel Limited, Hong Kong (CN)

(72) Inventors: Edwin Yee Man Keh, Hong Kong (CN); Lei Yao, Hong Kong (CN); Alex Chan, Hong Kong (CN); Hanrong Zhang, Hong Kong (CN); Un Teng Lam, Hong Kong (CN); Xin Chen, Hong Kong (CN)

(73) Assignee: The Hong Kong Research Institute of Textiles and Apparel Limited, Hong Kong (CN)

( * ) Notice: Subject to any disclaimer, the term of this patent is extended or adjusted under 35 U.S.C. 154(b) by 849 days.

(21) Appl. No.: 17/905,512

(22) PCT Filed: Mar. 12, 2020

(86) PCT No.: PCT/CN2020/078959
§ 371 (c)(1),
(2) Date: Sep. 2, 2022

(87) PCT Pub. No.: WO2021/179243
PCT Pub. Date: Sep. 16, 2021

(65) Prior Publication Data
US 2023/0139921 A1 May 4, 2023

(51) Int. Cl.
*B01J 20/24* (2006.01)
*B01D 53/62* (2006.01)
*B01D 53/81* (2006.01)
*B01D 53/96* (2006.01)
*B01J 20/28* (2006.01)
*B01J 20/30* (2006.01)
*C08B 15/06* (2006.01)

(52) U.S. Cl.
CPC .............. *B01J 20/24* (2013.01); *B01D 53/62* (2013.01); *B01D 53/81* (2013.01); *B01D 53/96* (2013.01); *B01J 20/28016* (2013.01); *B01J 20/28023* (2013.01); *B01J 20/3085* (2013.01); *C08B 15/06* (2013.01); *B01D 2252/204* (2013.01); *B01D 2257/504* (2013.01); *B01D 2258/06* (2013.01)

(58) Field of Classification Search
None
See application file for complete search history.

(56) References Cited

U.S. PATENT DOCUMENTS

2018/0036713 A1 2/2018 Li et al.

FOREIGN PATENT DOCUMENTS

CN 105936650 A 9/2016
CN 106894097 A 6/2017

OTHER PUBLICATIONS

Sehaqui et al.; Fast and Reversible Direct CO2 Capture from Air onto All-Polymer Nanofibrillated; Cellulose-Polyethylenimine Foams Environ. Sci. Technol.; Jan. 28, 2015; vol. 49; pp. 3167-3173.

(Continued)

*Primary Examiner* — Daniel Berns
(74) *Attorney, Agent, or Firm* — S&F/WEHRW

(57) ABSTRACT

Provided herein are amine-functionalized cellulose polymers useful for carbon dioxide capture and methods of preparation and use thereof.

13 Claims, 18 Drawing Sheets

(56) References Cited

OTHER PUBLICATIONS

Extended European Search Report of EP application No. 20162638.9 issued from the EPO on Sep. 21, 2020.
Hao-Yang Mi et al: "High-performance flexible triboelectric nanogenerator based on porous aerogels and electrospun nanobibers for energy harvesting and sensitive self-powered sensing", Nano Energy, vol. 48, Mar. 30, 2018, pp. 327-336, XP055729987, ISSN: 2211-2855, DOI: 10.1016/j.nanoen.2018.03.050.
Lucio Melone et al: "Tempo-Oxidized Cellulose Cross-Linked with Branched Polyethyleneimine: Nanostructured Adsorbent Sponges for Water Remediation", ChemPlusChem, vol. 80, No. 9, Jun. 5, 2015, pp. 1408-1415, XP055729966, ISSN: 2192-6506, DOI: 10.1002/cplu.201500145.
Communication pursuant to Article 94(3) EPC of EP application No. 20162638.9 issued from the EPO on Nov. 20, 2025.
Tsuguyuki Saito et al: "Cellulose nanofibers prepared by TEMPOmediated oxidation of native cellulose", Biomacromolecules, American Chemical Society, US, vol. 8, No. 8, Jan. 1, 2007 (Jan. 1, 2007), pp. 2485-2491, XP003027731, ISSN: 1525-7797, DOI: 10.1021/BM0703970 retrieved on Jul. 13, 2007.
Sehaqui Houssine et al: "Fast and Reversible Direct CO2 Capture from Air onto All-Polymer Nanofibrillated Cellulose-Polyethylenimine Foams", Environmental Science & Technology, vol. 49, No. 5, Feb. 11, 2015 (Feb. 11, 2015), pp. 3167-3174, XP055823890, US ISSN: 0013-936X, DOI: 10.1021/es504396v.

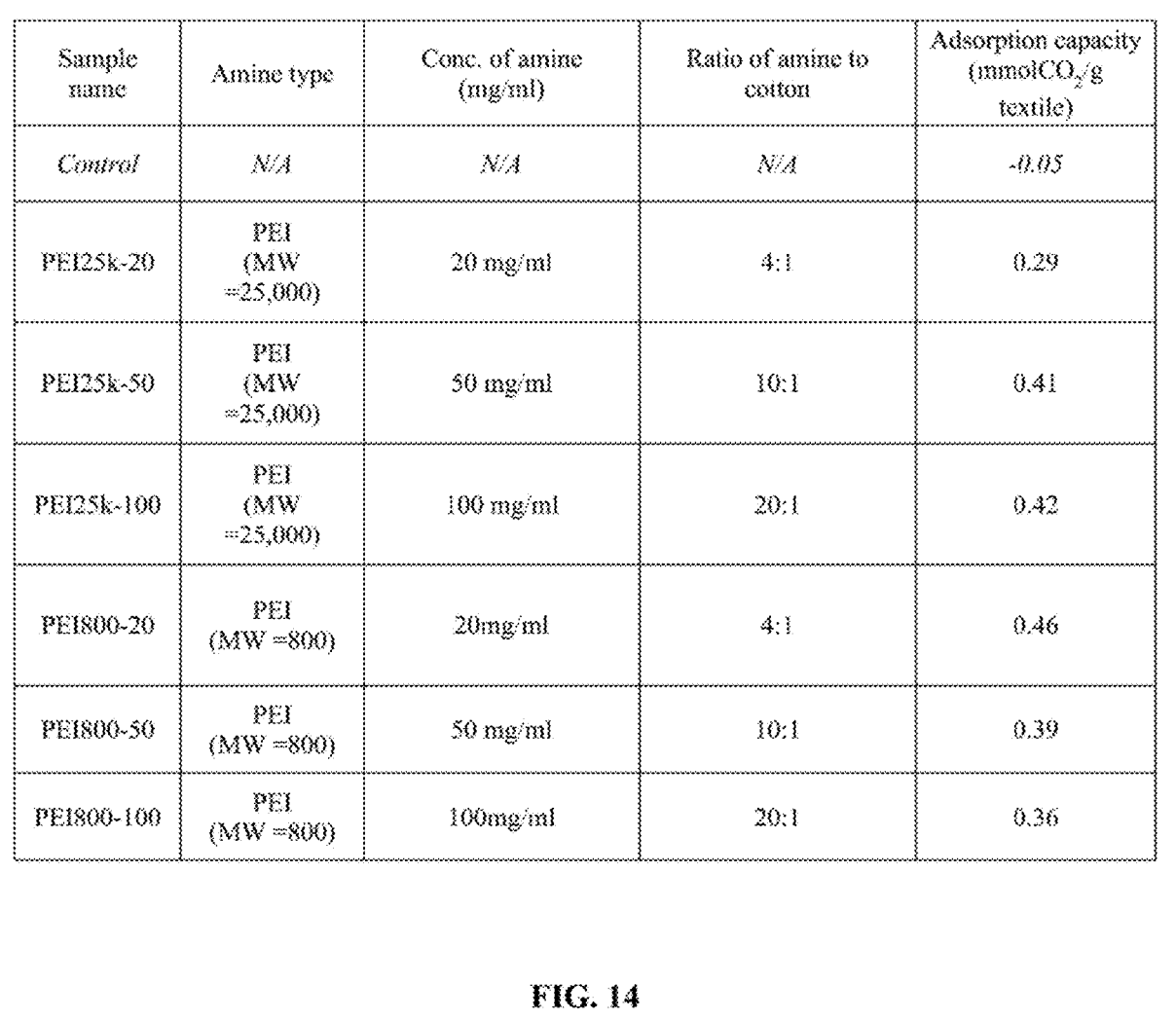

| Sample name | Amine type | Conc. of amine (mg/ml) | Ratio of amine to cotton | Adsorption capacity (mmol$CO_2$/g textile) |
|---|---|---|---|---|
| *Control* | *N/A* | *N/A* | *N/A* | *-0.05* |
| PEI25k-20 | PEI (MW =25,000) | 20 mg/ml | 4:1 | 0.29 |
| PEI25k-50 | PEI (MW =25,000) | 50 mg/ml | 10:1 | 0.41 |
| PEI25k-100 | PEI (MW =25,000) | 100 mg/ml | 20:1 | 0.42 |
| PEI800-20 | PEI (MW =800) | 20mg/ml | 4:1 | 0.46 |
| PEI800-50 | PEI (MW =800) | 50 mg/ml | 10:1 | 0.39 |
| PEI800-100 | PEI (MW =800) | 100mg/ml | 20:1 | 0.36 |

FIG. 14

| Sample name | Amine type | Conc. of amine (mg/ml) | Ratio of amine to cotton | Adsorption capacity (mmol$CO_2$/g textile) | Desorption capacity (50°C, 1h) (mmol$CO_2$/g textile) |
|---|---|---|---|---|---|
| PEI25k-50 | PEI (MW =25,000) | 50mg/ml | 10:1 | 0.41 | 0.45 |
| PEI800-50 | PEI (MW =800) | 50mg/ml | 10:1 | 0.39 | 0.31 |

AMINE-FUNCTIONALIZED CELLULOSE POLYMERS FOR $CO_2$ CAPTURE

TECHNICAL FIELD

The present disclosure relates to amine-functionalized cellulose polymers useful for carbon dioxide capture and methods of preparation and use thereof.

BACKGROUND

The increasing emission of major anthropogenic greenhouse gases, particularly carbon dioxide ($CO_2$), is of grave environmental concern. According to Emission Database for Global Atmospheric Research, the emission of $CO_2$ dramatically increased to 36.2 billion tonnes in 2015, which was 57% more than that of two decades ago. The increase of industrial activities has resulted in the raise of atmospheric $CO_2$ levels from 280 ppm to 400 ppm over the last 150 years. Moreover, $CO_2$ atmospheric levels are estimated to reach 600-1,550 ppm, causing a serious global warming effect. Therefore, it is necessary to develop different strategies for $CO_2$ mitigation.

There exist different approaches for reducing atmospheric $CO_2$ levels, such as (1) reducing energy intensity; (2) reducing carbon intensity; and (3) enhancing the sequestration of $CO_2$. Various strategies focusing on these directions have been developed, including enhanced energy efficiency and energy conservation, increased usage of clean fuels, increased adoption of clean coal technologies, use of renewable energy, development of nuclear power, afforestation and reforestation, as well as $CO_2$ capture and storage.

Amongst the various approaches for reducing atmospheric $CO_2$, capture and storage of $CO_2$ for reuse is an efficient way for $CO_2$ removal in fossil fuel-fired power plants. One method is to prevent $CO_2$ from escaping into air from the power plant. The control in power plant can be processed during three stages: pre-combustion capture, post-combustion capture, and oxyfuel combustion. On the other hand, various techniques have been developed for specific separation of $CO_2$ from fossil fuel-fired power plant gaseous waste. For example, amine or ammonia solution has been used in power plants to absorb $CO_2$ and has a recovery rate high up to 98%.

Though it may be cost-effective to capture $CO_2$ from a concentrated emission source, such as power plant, it is estimated that around one third of global carbon emissions are related to distributed indoor and outdoor emission sources. Therefore, the concept of capturing $CO_2$ directly from air was proposed in 1999, which is found to be very useful for controlling $CO_2$ levels from distributed emission sources. Sorbents suitable for direct air capture (DAC) can be divided into four categories: (1) aqueous hydroxide sorbents; (2) solid alkali carbonates; (3) biological sorbents; and (4) organic-inorganic hybrid sorbents. Organic-inorganic hybrid sorbents, which are usually solid-supported amine materials, by lower relative energy requirements for $CO_2$ sorption. Different chemical modifications have been applied to conjugate amine-containing moieties onto supporting substrate surfaces to obtain $CO_2$ adsorbents. In general, they are classified into three classes with different modifications chemistry, including: (1) impregnating amines into pores of a solid support; (2) formation of ionic bonding of amines to the walls of porous materials; and (3) direct ionic tethering via in situ polymerization of amine containing monomers. However, existing methods suffer from low $CO_2$ capture efficiency, high regeneration temperatures, or require the use of costly and/or environmentally unfriendly materials.

Textile materials are a ubiquitous and renewable raw material. In 2017, the United States alone generated almost 17 million tons of post-consumer textile waste. Only 2.5 million tons of post-consumer textile waste was recycled. The remainder of the waste was incinerated or disposed of in a landfill. Given the ever increasing amount of post-consumer textile waste, there is a growing need for value added post-consumer textile waste derived materials.

There thus exists the need for improved cellulose-derived substrates useful for $CO_2$ capture that overcome and/or address at least some of the challenges described above.

SUMMARY

The present disclosure relates to an amine-functionalized cellulose polymer and methods of use and preparation thereof. The objects are achieved by the compositions and methods as claimed in the attached claims and described herein.

In a first aspect, provided herein is an amine-functionalized cellulose polymer comprising a repeating unit of Formula 1:

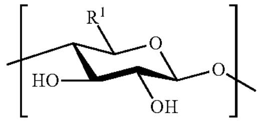

1 or a conjugate salt thereof, wherein $R^1$ is —(C═O)NHR$^2$ or —H(C═N—R$^2$); and $R^2$ is a polyalkylenimine or an alkylsilane, wherein the polyalkylenimine and the alkylsilane optionally crosslink two or more repeating units of Formula 1; and $R^2$ in two instances of the repeating unit of Formula 1 are optionally crosslinked with a moiety represented by:

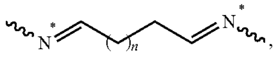, wherein n is a whole number selected from 2-6 and each N* independently represents a nitrogen in the polyalkylenimine.

In a first embodiment of the first aspect, provided herein is the amine-functionalized cellulose polymer of the first aspect, wherein the polyalkylenimine is selected from the group consisting of polyethylenimine (PEI), tetraethylenepentamine (TEPA), diethylenetriamine (DETA), and pentaethylenehexamine (PEHA).

In a second embodiment of the first aspect, provided herein is the amine-functionalized cellulose polymer of the first aspect, wherein n is 2.

In a third embodiment of the first aspect, provided herein is the amine-functionalized cellulose polymer of the first aspect, wherein the amine-functionalized cellulose polymer is in the form of a powder or a textile.

In a fourth embodiment of the first aspect, provided herein is the amine-functionalized cellulose polymer of the first aspect, wherein the polyalkylenimine is PEI with an average molecular weight of 25,000 amu and the amine-functionalized cellulose polymer has a $CO_2$ adsorption capacity of 0.29 to 0.42 mmol $CO_2$ per gram of cellulose powder.

In a second aspect, provided herein is a method of removing carbon dioxide ($CO_2$) from a gas comprising: contacting the amine-functionalized cellulose polymer of claim 1 with the gas thereby forming an amine-functionalized cellulose polymer $CO_2$ conjugate and removing $CO_2$ from the gas.

In a first embodiment of the second aspect, provided herein is the method of first aspect, further comprising the step of heating the amine-functionalized cellulose polymer $CO_2$ conjugate at 50 to 120° C. thereby desorbing $CO_2$ from the cellulose polymer $CO_2$ conjugate and regenerating the amine-functionalized cellulose polymer.

In a third aspect provided herein is a method of preparing the amine-functionalized polymer of the first aspect, the method comprising: contacting a cellulose polymer comprising a repeating unit of Formula 2:

2

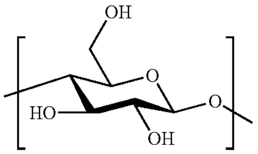

with an oxidant thereby forming an oxidized cellulose polymer comprising a repeating moiety of Formula 3:

3

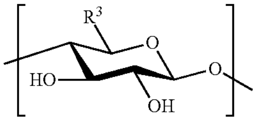

or a conjugate salt thereof, wherein $R^3$ is —$CO_2H$ or —CHO;

contacting the oxidized cellulose polymer with a polyalkylenimine or an alkylsilane, with the proviso that when $R^3$ is —$CO_2H$, a coupling agent is also present during the step of contacting the oxidized cellulose polymer with the polyalkylenimine or the alkylsilane; thereby forming the amine-functionalized polymer of claim 1; and optionally contacting the amine-functionalized polymer of claim 1 with $CHO(CH_2)_nCH_2CHO$, wherein n is a whole number selected between 2-6.

In a first embodiment of the third aspect, provided herein is the method of the third aspect, wherein the cellulose polymer is in the form of a cellulose powder or a textile.

In a second embodiment of the third aspect, provided herein is the method of the third aspect, wherein the cellulose polymer is present at a concentration of 0.5-10% wt.

In a third embodiment of the third aspect, provided herein is the method of the third aspect, wherein the oxidant comprises laccase and (2,2,6,6-tetramethylpiperidin-1-yl) oxyl (TEMPO) or NaClO, TEMPO, and NaBr.

In a fourth embodiment of the third aspect, provided herein is the method of the third aspect, wherein the cellulose polymer is present at a concentration of 0.5-2.0% wt; the laccase is present at a concentration of 0.1-10% wt; and TEMPO is present at a concentration of 0.1-10% wt.

In a fifth embodiment of the third aspect, provided herein is the method of the third aspect, wherein the cellulose polymer is present at a concentration of 5-10% wt; NaBr is present at a concentration of 0.1-1% wt; TEMPO is present at a concentration of 0.01-0.1%; and NaClO is present at a concentration of 0.1-10% wt.

In a sixth embodiment of the third aspect, provided herein is the method of the third aspect, wherein the polyalkylenimine is selected from the group consisting of PEI, TEPA, DETA, and PEHA.

In a seventh embodiment of the third aspect, provided herein is the method of the third aspect, wherein the polyalkylenimine is present at a concentration of 2-10% wt.

In an eighth embodiment of the third aspect, provided herein is the method of the seventh embodiment of the third aspect, wherein —$R^3$ is $CO_2H$ and the coupling agent comprises N-(3-(dimethylamino) propyl)-N'-ethylcarbodiimide hydrochloride (EDC) and N-hydroxysuccinimide (NHS).

In a ninth embodiment of the third aspect, provided herein is the method of the eighth embodiment of the third aspect, wherein EDC is present at a concentration of 2-8% by wt; and NHS is present at a concentration of 2-8% by wt.

In a tenth embodiment of the third aspect, provided herein is the method the third aspect, wherein the method further comprises the steps of combining the amine-functionalized polymer with a binder thereby forming a surface finishing solution; contacting a textile with the surface finishing solution thereby forming a surface finishing solution treated textile; and optionally curing the surface finishing solution treated textile, wherein the cellulose polymer is in the form of a cellulose powder.

In an eleventh embodiment of the third aspect, provided herein is the method of the third aspect, wherein $R^3$ is —CHO; the step of contacting the cellulose polymer with the oxidant is conducted at 35-45° C., wherein the cellulose polymer is present at a concentration of 0.5-2.0% wt; the oxidant comprises laccase and TEMPO, wherein the laccase is present at a concentration of 0.1-10% wt; and TEMPO is present at a concentration of 0.1-10% wt; and the step of contacting the oxidized cellulose polymer with the polyalkylenimine is conducted at 20-40° C., wherein the polyalkylenimine is PEI and the PEI is present at a concentration of 2-10% wt.

In a twelfth embodiment of the third aspect, provided herein is the method of the third aspect, wherein $R^3$ is —$CO_2H$; the step of contacting the cellulose polymer with the oxidant is conducted at 24-40° C., wherein the cellulose polymer is present at a concentration of 5-10% wt; the oxidant comprises NaClO, TEMPO, and NaBr, wherein NaBr is present at a concentration of 0.1-1% wt; TEMPO is present at a concentration of 0.01-0.1%; and NaClO is present at a concentration of 0.1-10% wt; and the step of contacting the oxidized cellulose polymer with the polyalkylenimine is conducted at 20-27° C., wherein the polyalkylenimine is PEI and the coupling agent comprises EDC and NHS, wherein PEI is present at a concentration of 2-10% wt; EDC is present at a concentration of 2-8% by wt; and NHS is present at a concentration of 2-8% by wt.

BRIEF DESCRIPTION OF DRAWINGS

The appended drawings, where like reference numerals refer to identical or functionally similar elements, contain figures of certain embodiments to further illustrate and clarify the above and other aspects, advantages and features of the present disclosure. It will be appreciated that these drawings depict exemplary embodiments of the invention and as such are not intended to limit its scope. The invention will be described and explained with additional specificity and detail through the use of the accompanying drawings in which:

FIG. 14 depicts Table 1 showing experimental data of $CO_2$ adsorption by PEI-functionalized cellulose polymers (cotton yarns) according to certain embodiments described herein at 25° C. under an atmosphere of 100% $CO_2$. The sorption period was 2.5 hours; and FIG. 15 depicts Table 2 showing experimental data of $CO_2$ adsorption by PEI-functionalized cellulose polymers (cotton yarns) according to certain embodiments described herein at 50° C. and a desorption duration of one hour.

DETAILED DESCRIPTION

The amine-functionalized cellulose polymers described herein are capable of adsorbing $CO_2$ from a gas, such as ambient air, by chemical reaction between the $CO_2$ and amines allowing significant uptake of $CO_2$, even at low $CO_2$ partial pressures. The disclosure provides amine-functionalized cellulose polymers that can be used as solid $CO_2$ sorbents.

Definitions

The definitions of terms used herein are meant to incorporate the present state-of-the-art definitions recognized for each term in the field of biotechnology. Where appropriate, exemplification is provided. The definitions apply to the terms as they are used throughout this specification, unless otherwise limited in specific instances, either individually or as part of a larger group.

When trade names are used herein, applicants intend to independently include the trade name product formulation, the generic drug, and the active pharmaceutical ingredient(s) of the trade name product.

The term "alkyl" is art-recognized, and includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 30 or fewer carbon atoms in its backbone (e.g., $C_1$-$C_{30}$ for straight chain, $C_3$-$C_{30}$ for branched chain), and alternatively, about 20 or fewer. Likewise, cycloalkyls have from about 3 to about 10 carbon atoms in their ring structure, and alternatively about 5, 6 or 7 carbons in the ring structure.

Weight percentages (% wt.) are expressed with respect to the amount of the specified material per 100 g of the solvent.

The amine-functionalized cellulose polymers described herein can comprise a cellulose polymer comprising one or more of the repeating units described herein.

In certain embodiments, the amine-functionalized cellulose polymer comprises a repeating unit of Formula 1:

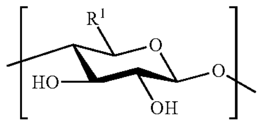

1 or a conjugate salt thereof, wherein $R^1$ is —(C═O)NHR$^2$ or —H(C═N—R$^2$); and $R^2$ is a polyalkylenimine or an alkylsilane, wherein the polyalkylenimine and the alkylsilane optionally crosslink two or more repeating units of Formula 1; and wherein $R^2$ in two instances of the repeating unit of Formula 1 are optionally crosslinked with a moiety represented by:

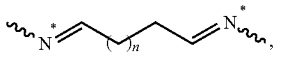

wherein n is a whole number selected from 2-6 and each N* independently represents a nitrogen in the polyalkylenimine.

Figure 16:
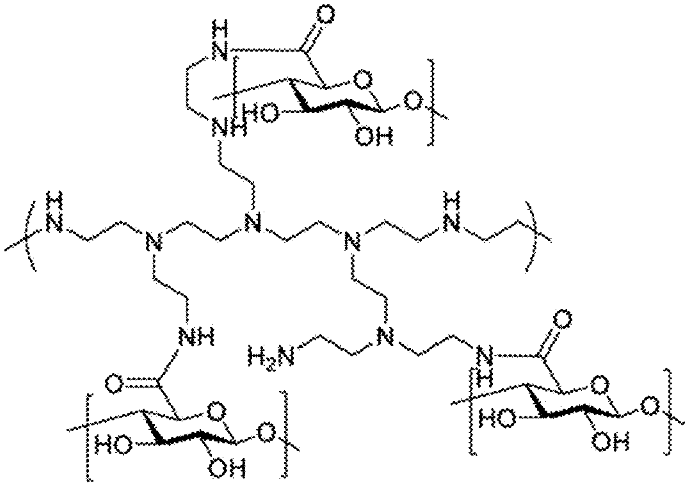
FIG. 16 depicts simplified chemical structures of amine-functionalized cellulose polymers crosslinked with: a branched polyethylenimine, wherein $R^1$ is —(C═O)NHR$^2$ (A) and $R^1$ is —H(C═N—R$^2$) (B); an alkylsilane, wherein $R^1$ is —(C═O)NHR$^2$ (C); and amine-functionalized cellulose polymer salts crosslinked with a protonated polyethylenimine (D) in accordance with certain embodiments described herein.
Figure 16:
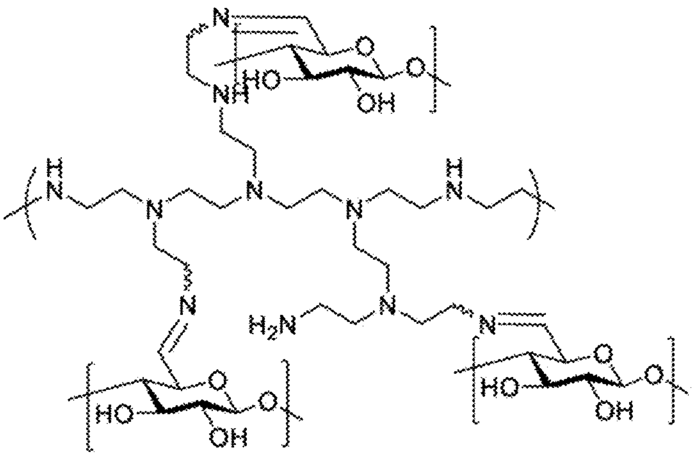
Figure 16:
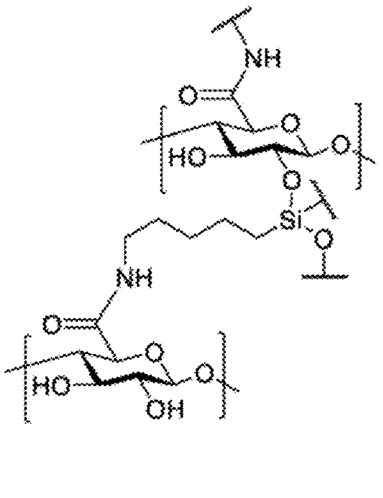
Figure 16:
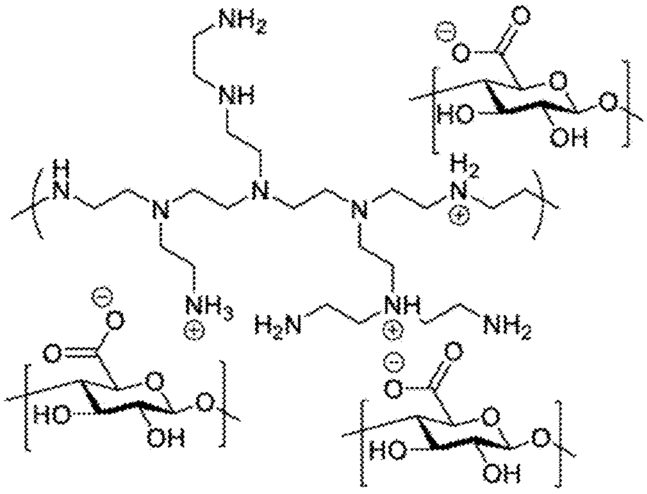

In certain embodiments, the polyalkylenimine and the alkylsilane crosslink two or more repeating units of Formula 1. The crosslink between two or more repeating units of Formula 1 may occur intramolecularly, intermolecularly, or a combination thereof. In instances in which $R^1$ is a polyalkylenimine, two or more nitrogen in the polyalkylenimine may crosslink two or more instances of $R^1$ in two or more repeating units of Formula 1 as exemplified in FIG. 16A or FIG. 16B. In instances in which $R^1$ is an alkylsilane, the alkylsilane may crosslink two or more repeating units of Formula 1 as exemplified in FIG. 16C.

The polyalkylenimine may be any polyalkylenimine known in the art. The polyalkylenimine may be linear, branched, cyclic, or dendritic. Whereas linear polyalkylenimines can exclusively comprise repeating units of Formula 5, in which A is an alkylene, branched polyalkylenimines can comprise both repeating units of Formula 5 and repeating units of Formula 6.

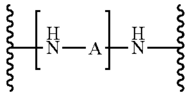

5

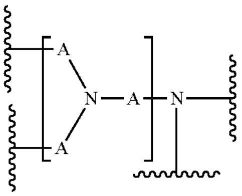

6

Figure 5A:
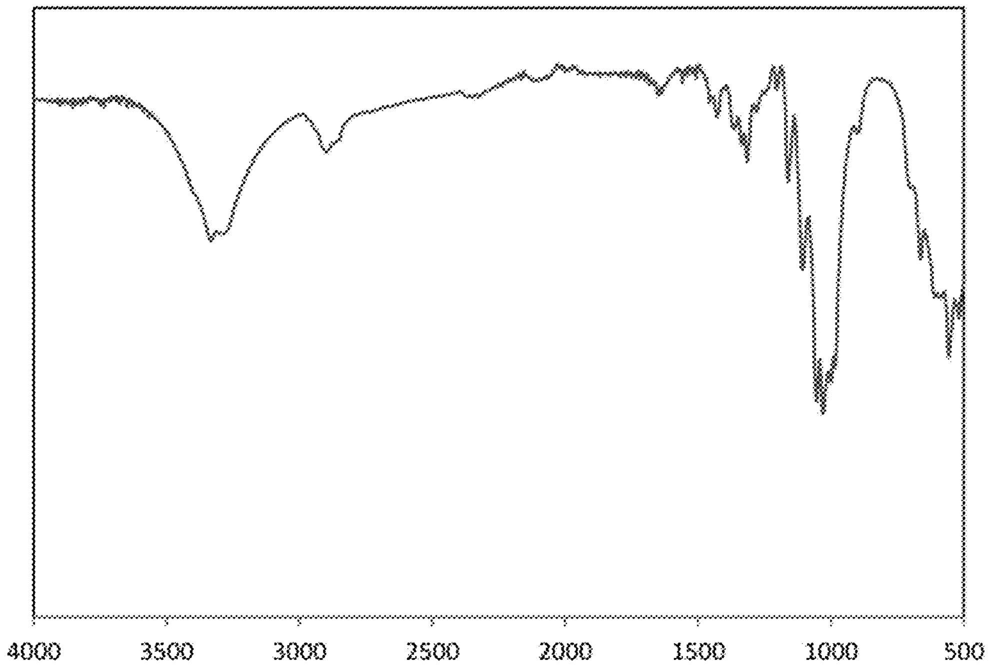
FIG. 5A depicts a Fourier-transform infrared (FTIR) spectroscopy spectrum of cotton fabric comprising cellulose polymers according to certain embodiments described herein.
Figure 5B:
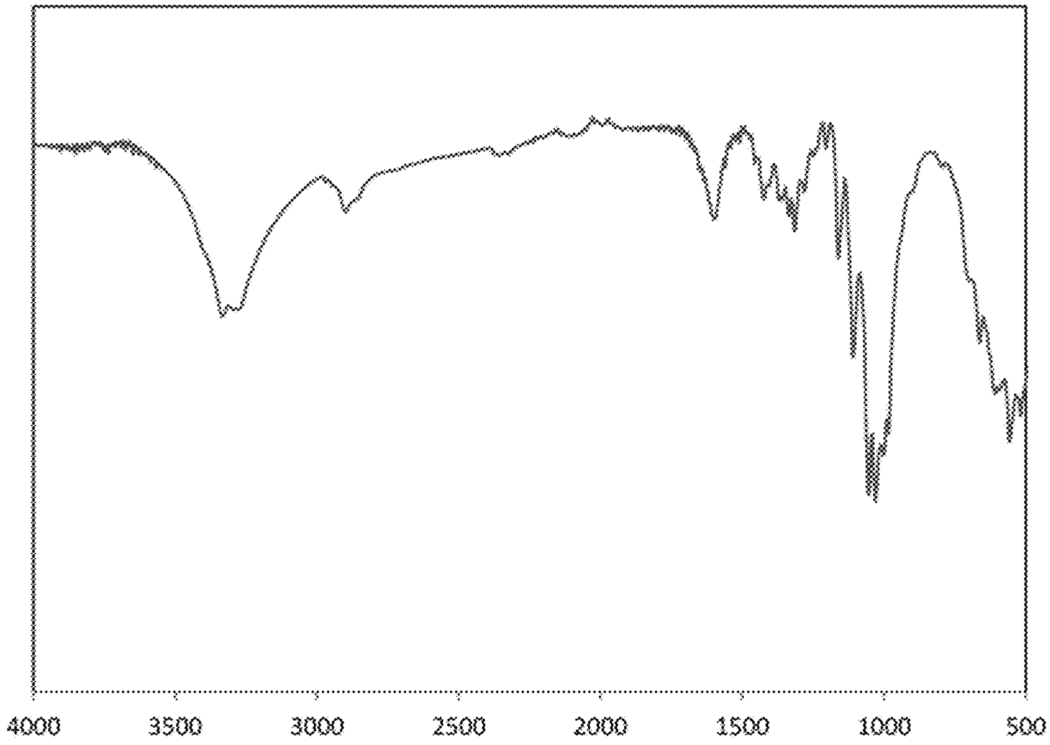
FIG. 5B depicts a FTIR spectrum of cotton fabric oxidized using NaClO/NaBr/TEMPO according to certain embodiments described herein with additional peaks at 1590 $cm^{-1}$ for C═O.
Figure 5C:
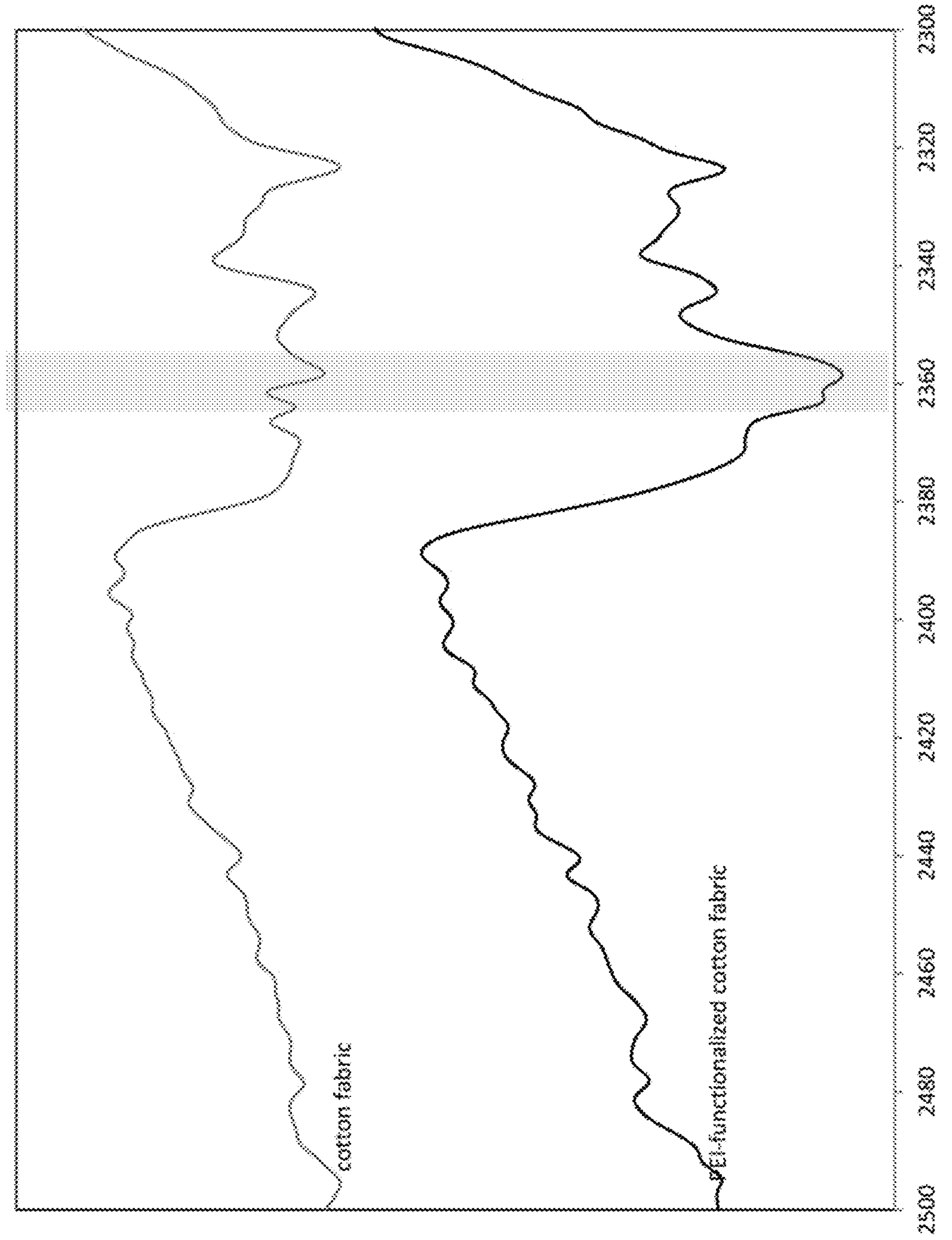
FIG. 5C depicts a FTIR of amine-functionalized cotton fabric according to certain embodiments described herein compared with non-modified cotton fabric with increased peaks at 2360 $cm^{-1}$ for $CO_2$ sorption observed.
Figure 6A:
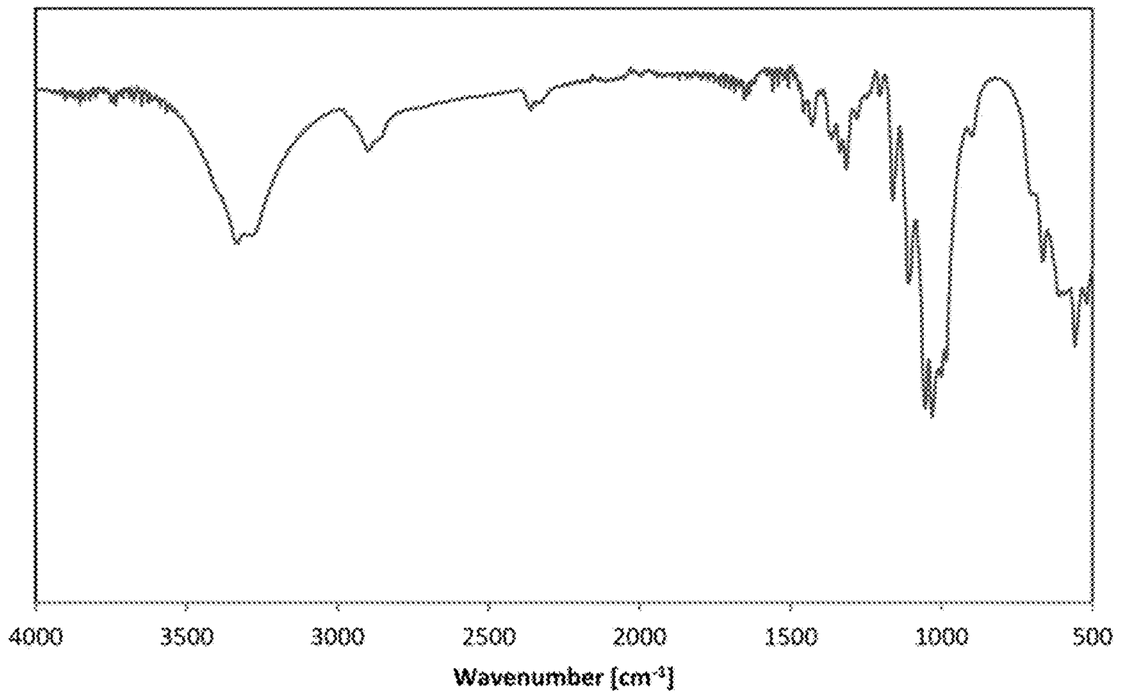
FIG. 6A depicts a FTIR spectrum of cellulose powder after hydrothermal treatment according to certain embodiments described herein.
Figure 6B:
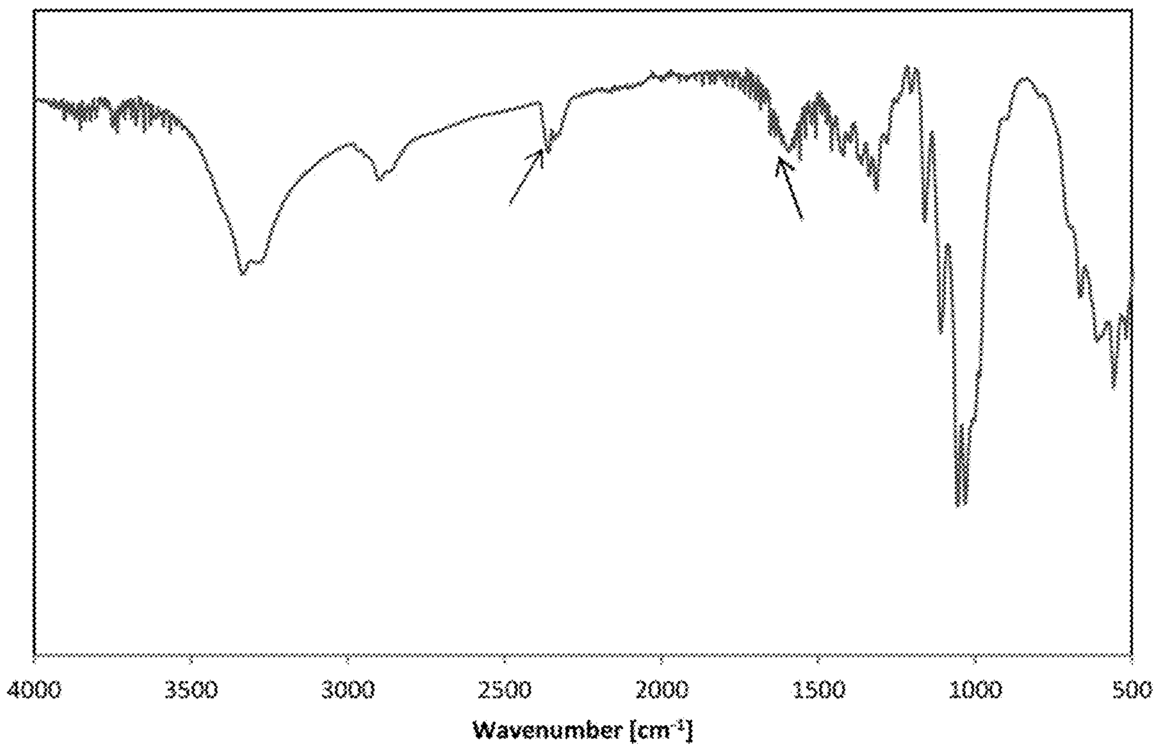
FIG. 6B depicts a FTIR of an amine-functionalized cellulose powder according to certain embodiments described herein with additional peaks at 1590 $cm^{-1}$ for C═O, and 2360 $cm^{-1}$ for $CO_2$ sorption.
Figure 7:
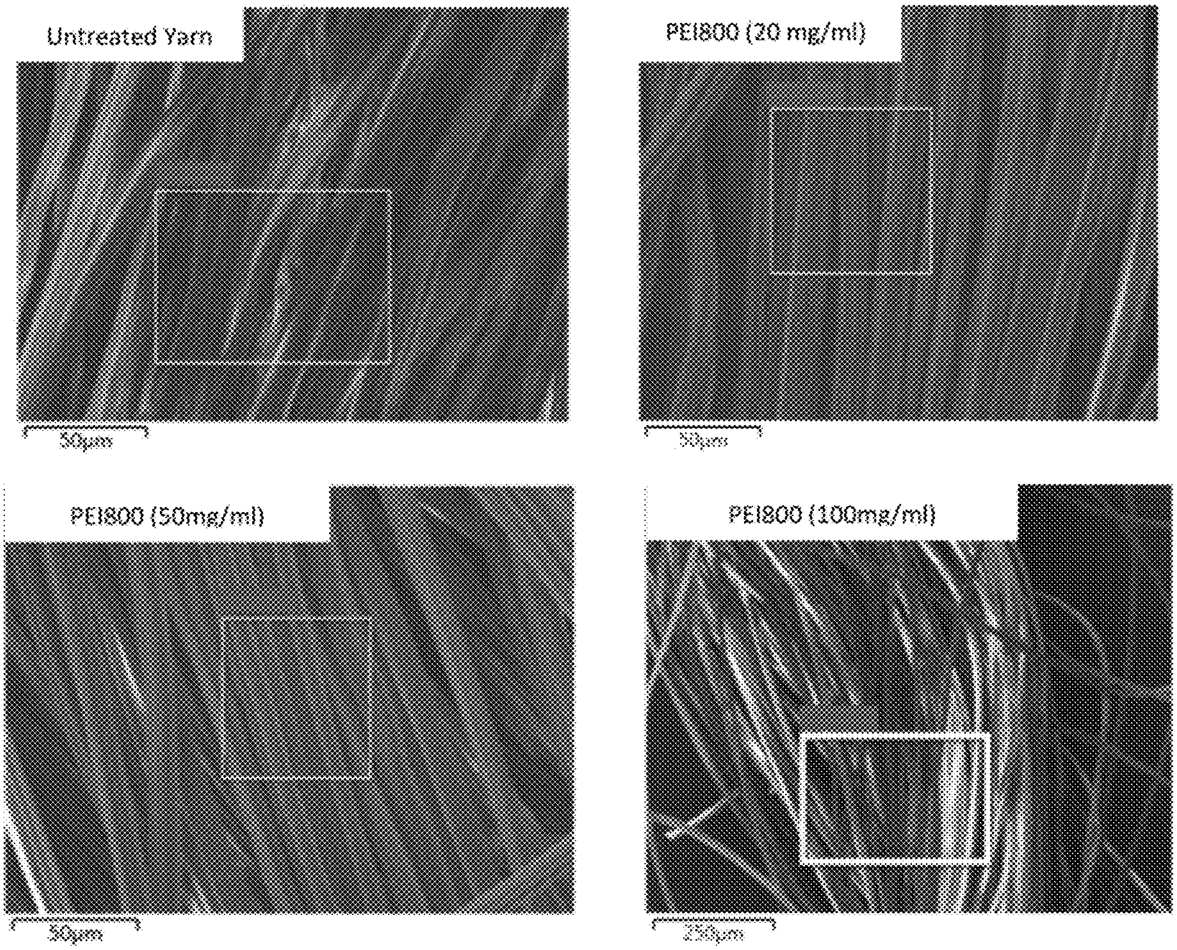
FIG. 7 depicts scanning electron microscopy (SEM) images of the amine-functionalized cotton yarns modified by polyethylenimine (MW=800) according to certain embodiments described herein.
Figure 8:
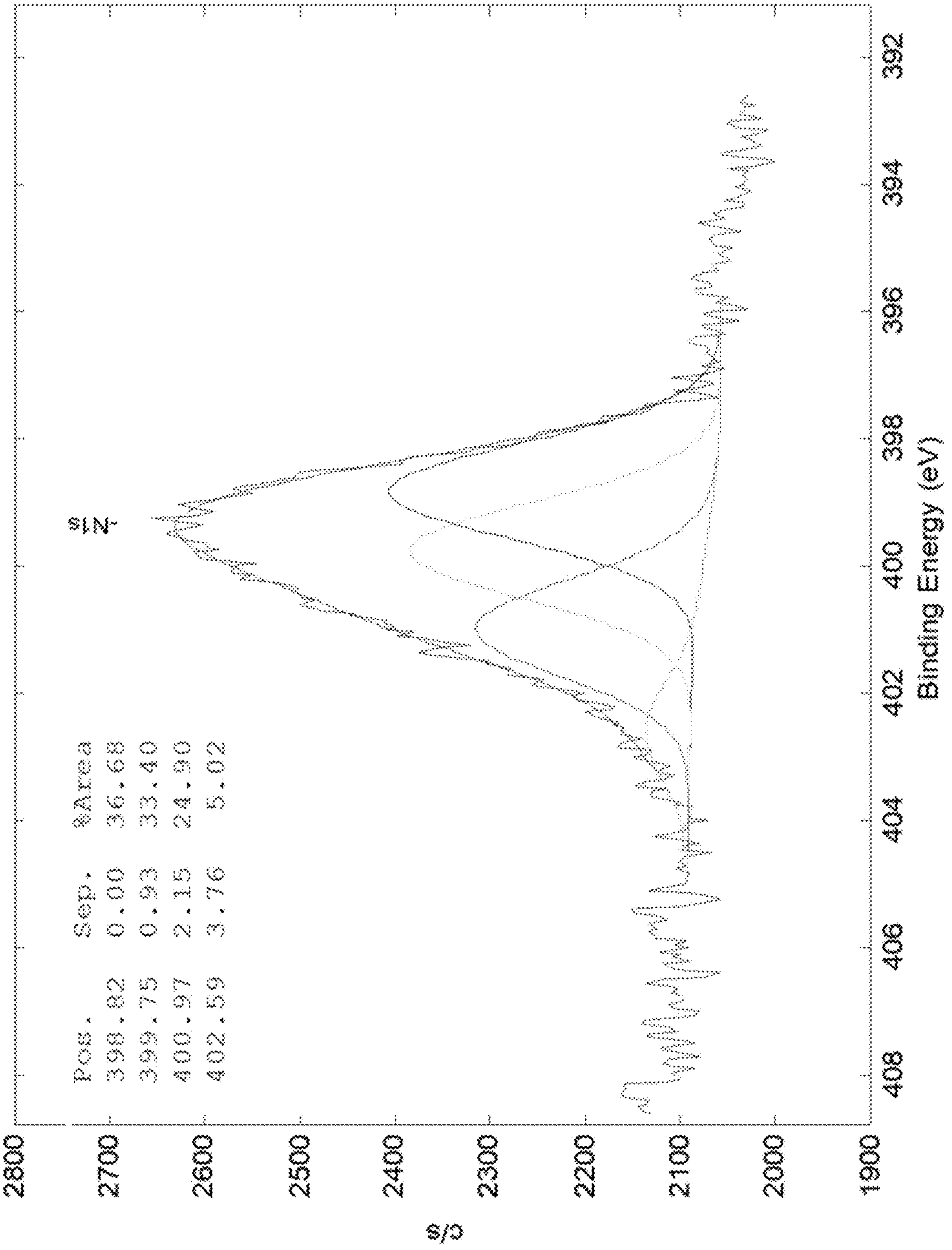
FIG. 8 depicts X-ray photoelectron spectroscopy (XPS) images of PEI-functionalized cotton yarns according to certain embodiments described herein with peaks at ~401 eV and ~402e V indicating the appearance of ammonium salt.

In FIGS. 5 and 6, A may be a $C_2$-$C_4$-alkylene. In certain embodiments, A is a $C_2$-alkylene.

The polyalkylenimine may have an average molecular weight of 100 to 30,000 amu; 100 to 1,000 amu; 500 to 1,000 amu; 20,000 to 30,000 amu; 23,000 to 30,000 amu; 23,000 to 27,000 amu; or 24,000 to 26,000 amu.

In certain embodiments, the polyalkylenimine is selected from the group consisting of PEI, TEPA, DETA, and PEHA. In certain embodiments, the polyalkylenimine is PEI with an average molecular weight between 800 to 25,000 amu. In certain embodiments, the PEI has an average molecular weight of 25,000 amu having primary, secondary, and tertiary amine end groups in a ratio of 1:1.2:0.76, respectively The alkylsilane may be represented by —$(CR_2)_m SiX_3$, wherein m is a whole number selected between 2-10; each instance of R is independently hydrogen or alkyl; and each X is hydrogen, alkyl, hydroxyl-O($C_1$-$C_6$ alkyl), or represents a covalent bond to the C2- or C3-hydroxyl moiety in the repeating unit of Formula 1. In certain embodiments, R is hydrogen and m is 2-6.

In certain embodiments of the repeating unit of the Formula 1, $R^1$ is —(C═O)NHR$^2$, wherein $R^2$ is a branched PEI with an average molecular weight between 800 to 25,000 amu; and wherein the PEI optionally crosslinks two or more repeating units of Formula 1.

Conjugate salts include the conventional nontoxic salts or quaternary ammonium salts of the compounds described herein, e.g., from nontoxic organic or inorganic acids. For example, such conventional nontoxic salts include those derived from inorganic acids such as hydrochloride, hydrobromic, sulfuric, sulfamic, phosphoric, nitric, and the like; and the salts prepared from organic acids such as the oxidized cellulose polymers described herein, acetic, propionic, succinic, glycolic, stearic, lactic, malic, tartaric, citric, ascorbic, palmitic, maleic, hydroxymaleic, phenylacetic, glutamic, benzoic, salicyclic, sulfanilic, 2-acetoxybenzoic, fumaric, toluenesulfonic, methanesulfonic, ethane disulfonic, oxalic, isothionic, and the like.

In other cases, the compounds described herein may contain one or more acidic functional groups and, thus, are capable of forming conjugate salts with bases. The term conjugate salts in these instances refer to the relatively non-toxic, inorganic and organic base addition salts of compounds of the present invention. Representative alkali or alkaline earth salts include the lithium, sodium, potassium, calcium, magnesium, and aluminum salts and the like. Representative organic amines useful for the formation of base addition salts include polyalkylenimine, aminoalkylsilane, ethylamine, diethylamine, ethylenediamine, ethanolamine, diethanolamine, piperazine and the like.

The amine-functionalized cellulose polymer may further comprise one or more repeating units of Formula 4:

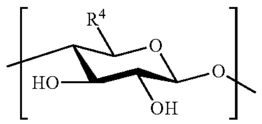

4 or a conjugate salt thereof, wherein $R^4$ for each instance is independently selected from —$CH_2OH$, —CHO, and —$CO_2H$.

In instances in which $R^4$ is —$CO_2H$, the one or more repeating units of Formula 4 may form conjugate salts with the amino groups of the polyalkylenimine thereby forming polyalkylenimine conjugate salts. In certain embodiments, the polyalkylenimine conjugate salts one or more crosslinks with one or more repeating units of Formula 4 and/or one or more repeating units of Formula 1.

In certain embodiments, the amine-functionalized cellulose polymer is a random copolymer comprising repeating units of Formula 1 and one or more of the repeating units of Formula 4. Depending on the reaction conditions and reagent stoichiometry used to prepare the amine-functionalized cellulose polymer, the ratio of repeating units repeating units of Formula 1 to repeating units of Formula 4 can be controlled. Selection of a desired ratio of repeating units of Formula 1 to repeating units of Formula 4 is well within the skill of a person of ordinary skill in the art.

Also provided is an amine-functionalized cellulose polymer salt comprising a repeating unit of Formula 5:

5

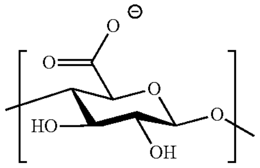

and a protonated polyalkylenimine, wherein the protonated polyalkylenimine optionally crosslinks two or more repeating units of Formula 5 via ionic interactions (e.g., salt formation). The protonated polyalkylenimine may be protonated at one or more amines within the polyalkylenimine. In certain embodiments, the protonated polyalkylenimine is protonated with 1, 2, 3, 4, 5, 6, 7, 8, 9, 10, or more protons.

The amine-functionalized cellulose polymer salt comprising a repeating unit of Formula 5 may further comprise one or more repeating units of Formula 4.

In certain embodiments, the amine-functionalized cellulose polymer comprising a repeating unit of Formula 1, further comprises one or more repeating units of Formula 4; the repeating unit of Formula 5, and a protonated polyalkylenimine, wherein the protonated polyalkylenimine optionally crosslinks two or more repeating units of Formula 5 via ionic interactions (e.g., salt formation).

The amine-functionalized cellulose polymers and amine-functionalized cellulose polymer salts described herein can provide a practical support for PEI, which advantageously improves handling of the material, application to other substrates, and physical and chemical properties.

The amine-functionalized cellulose polymer or amine-functionalized cellulose polymer salt may take any physical form, such as a powder or a textile. The textile may be in the form of a fabric (such as curtains or wall paper), a fiber, a filament, a film, a garment, upholstery, chopped or flocculated fiber, and combinations thereof. In instances in which the amine-functionalized cellulose polymer is in the form of a powder, the amine-functionalized cellulose polymer powder can have a particle size below 100 μm. In certain embodiments, the amine-functionalized cellulose polymer powder has a particle size of 1 to 100 μm; 10 to 100 μm; or 50 to 100 μm.

Also provided herein is a surface finishing solution comprising the amine-functionalized cellulose polymer or amine-functionalized cellulose polymer salt, e.g., in powder form, a binder, and optionally water. The surface finishing solution can be applied to the surface of a substrate, such as a textile, to impart $CO_2$ adsorption properties to the substrate.

Any binder known in the art can be used in connection with the methods described herein. In certain embodiments, the binder is a commercial water based binder commonly used for pad-dry-cure process. Binders can be acrylic-based, butadiene-based, or polyurethane-based. Exemplary binders, include, but are not limited to Dow Primal™ ECO-1291, Dow Rhoplex R-3349, Achitex Minerva Mineprint Binder ACM, Michelman® 4983-40R, and Achitexminerva Binder WST. Exemplary polyurethane-based binders include, but are not limited to, Tanatex Baygard® FBI and Bondthane™ UD-303. In certain embodiments, the binder is an acrylic-based binder.

The amine-functionalized cellulose polymers described herein possess high $CO_2$ adsorption properties. As demonstrated in FIGS. 14 and 16, the amine-functionalized cellulose polymers described herein can have $CO_2$ adsorption capacities as high as 0.46 mmol $CO_2$/g of amine-functionalized cellulose polymer. FIG. 15 demonstrates that after $CO_2$ sorption that the amine-functionalized cellulose polymers can be efficiently regenerated by heating the amine-functionalized cellulose polymer $CO_2$ conjugate at 50° C. for one hour.

In certain embodiments, the amine-functionalized cellulose polymers described herein have a $CO_2$ adsorption capacity between 0.25-0.46, 0.29-0.46, 0.31-0.46, 0.36-0.46, 0.39-0.46, 0.41-0.46, or 0.42-0.46 mmol $CO_2$/g of amine-functionalized cellulose polymer.

In certain embodiments, up 75%, 80%, 85%, 90%, 95%, 99%, or more of the amine-functionalized cellulose polymer can be efficiently regenerated by heating the amine-functionalized cellulose polymer $CO_2$ conjugate at a temperature between 30-100° C., 40-100° C., 40-90° C., 40-80° C., 40-70° C., 40-60° C., or 45-55° C.

The amine-functionalized cellulose polymers described herein can be prepared according to a method comprising: contacting a cellulose polymer comprising a repeating unit of Formula 2:

2

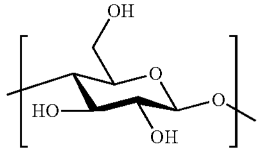

with an oxidant thereby forming an oxidized cellulose polymer comprising a repeating moiety of Formula 3:

3

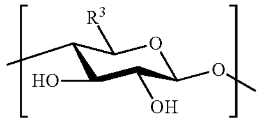

or a conjugate salt thereof, wherein $R^3$ is —$CO_2H$ or —CHO; contacting the oxidized cellulose polymer with a polyalkylenimine or an alkylsilane, with the proviso that when $R^3$ is —$CO_2H$, a coupling agent is also present during the step of contacting the oxidized cellulose polymer with the polyalkylenimine or the alkylsilane; thereby forming the amine-functionalized polymer of claim 1; and optionally contacting the amine-functionalized polymer of claim 1 with $CHO(CH_2)_nCH_2CHO$, wherein n is a whole number selected between 2-6.

Figure 1:
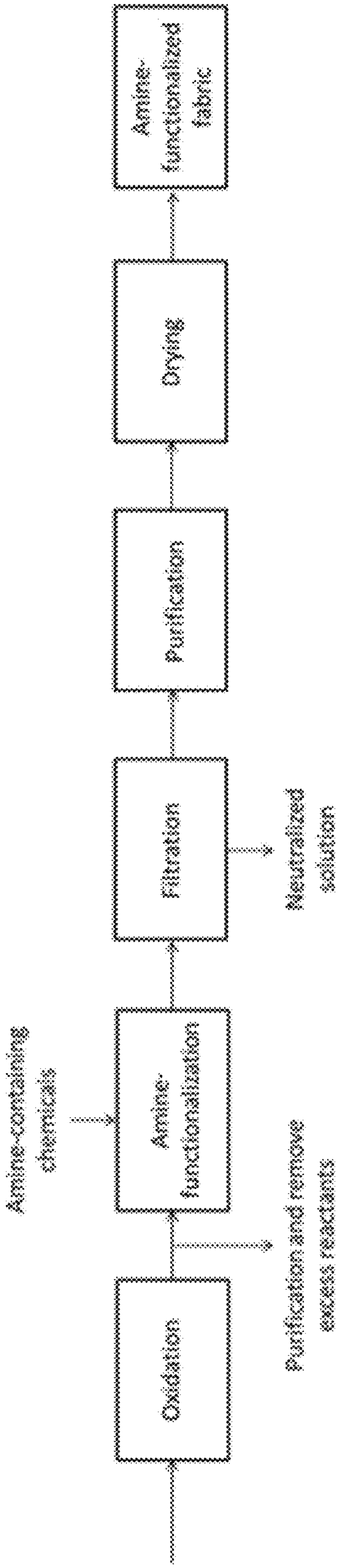
FIG. 1 depicts a flow chart showing the steps for preparing the amine-functionalized cellulose polymer according to certain embodiments described herein.

FIG. 1 depicts a general schematic for the process for preparing the amine-functionalized cellulose polymers according to certain embodiments described herein.

The amine-functionalized cellulose polymer salt comprising a repeating unit of Formula 5 can be prepared by contacting a cellulose polymer comprising a repeating unit of Formula 6:

6

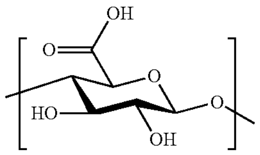

with a polyalkylenimine thereby forming the amine-functionalized cellulose polymer salt comprising a repeating unit of Formula 5.

The amine-functionalized cellulose polymers described herein can be prepared from a large variety of cellulose polymer containing raw materials. In certain embodiments, the cellulose polymer may be synthetic or of any plant origin, and includes, for example, those fibrous materials derived from natural products containing celluloses, such as any one or a combination of wood, bamboo, cotton, banana, piña, hemp ramie, linen, coconut palm, soya, hoya, bagasse, kanaf, retting, mudrar, cotton, linen, and flax.

The cellulose polymer may take any physical form, including a cellulose powder or a cellulosic textile. The cellulosic textile may be in the form of a fabric, a fiber, a filament, a film, garment, chopped or flocculated fiber, and combinations thereof.

The cellulose powder can be prepared from virgin cellulose powder or a recycled cellulose powder, e.g., from post-consumer cellulosic textile waste. The cellulose powder can have a particle size below 100 μm. In certain embodiments, the cellulose powder has a particle size of 1 to 100 μm; 10 to 100 μm; or 50 to 100 μm.

The cellulose powder used in connection with the methods described herein can be prepared according to any method known in the art. In certain embodiments, the cellulose powder is prepared using a hydrolysis method. The hydrolysis method may be acid hydrolysis, alkaline oxidative decomposition, hydrothermal treatment, steam explosion, or the like, or a combination of two kinds of such methods. The cellulose powder can be obtained by hydrothermal treatment of a cellulosic textile comprising a cellulose polymer, such as cotton (e.g., see methods described in PCT Patent Application No. PCT/CN2019/107499, hereby incorporated by reference).

The cellulose powder may be prepared, for example, by an organic acid catalyzed hydrothermal treatment of a post-consumer textile comprising a natural, semi-synthetic, and/or synthetic cellulosic material or a natural cellulosic material.

In certain embodiments, the cellulose powder is prepared by subjecting the post-consumer textile to an organic acid catalyzed hydrothermal treatment, the method comprising the step of bringing into contact the post-consumer textile, an aqueous solution, and an organic acid and heating the resulting mixture.

Hydrothermal treatment involves the chemistry of hot water under pressure to carry out chemical reactions. These reactions are usually conducted at temperatures ranging from 100 to 350° C. and pressures in the range from 0.1 to 15 MPa. In certain embodiments, the hydrothermal treatment is conducted at 120-150° C., 125-145° C., 130-140° C., or 132-138° C. In certain embodiments, the hydrothermal treatment is conducted at 0.1 to 0.5, 0.2 to 0.5, 0.2 to 0.4, or 0.25 to 0.35 MPa. The reaction medium may be water alone or in combination with inorganic and/or organic acids.

The organic acid can be methanesulfonic acid, oxalic acid, tartaric acid, citric acid, malic acid, formic acid, acetic acid, or a combination thereof. In certain embodiments, the hydrothermal treatment aqueous solution contains the organic acid catalyst in an amount of 0.1% to 30% or 0.5% to 10% wt/wt. The addition of a larger amount of acid can accelerate the rate of the hydrothermal treatment reaction can shorten the time required for completion and/or assist with decomposition of thicker and/or denser post-consumer textiles.

The post-consumer textile may comprise cotton or polyester and cotton, such as PET and cotton. In instances in which the post-consumer textile contains polyester, it may contain any proportion of polyester content, for example from 1-99% wt/wt.

The post-consumer textile can optionally be divided, e.g., by cutting, tearing, and/or shredding, into smaller pieces prior to the preparation of the cellulose powder. This optional step can improve the yield of cellulose powder and reduce treatment time by increasing the surface area of the treated post-consumer textile.

In certain embodiments, the ratio of solids (i.e., the post-consumer textile) to liquid is 1:30-200 or 1:50-150 by weight. Lower ratios of solid to liquid tend to accelerate the rate of the hydrothermal treatment reaction.

In certain embodiments, hydrothermal treatment comprises heating the mixture at a temperature between 110-180° C. In certain embodiments, hydrothermal treatment comprises heating the mixture at a temperature between 120-150° C. The temperature of the hydrothermal treatment can be increased at a rate of 4-6° C./minute from room temperature to the desired temperature (e.g., 110-180° C. or 120-150° C.).

In certain embodiments, the hydrothermal treatment is conducted at a pressure of 0.1 to 10 MPa or 0.1 to 1 MPa. In certain embodiments, hydrothermal treatment is conducted under autogenic pressure, i.e., pressure generated as a result of heating in a closed system. Alternatively or additionally, the pressure can be applied externally, e.g., by mechanical means.

In certain embodiments, the hydrothermal treatment is conducted in a closed high-pressure reactor, and the temperature is raised to 110-180° C. at a heating rate of 4-6° C./min and then maintained under stirring. During the hydrothermal treatment, the autogenous pressure in the closed higher-pressure reactor can be in the range of 0.10-1 MPa. The hydrothermal treatment can be completed in 0.5-3 h.

During hydrothermal treatment, subcritical conditions can be achieved in which the cotton fiber can undergo an acid catalyzed hydrolytic degradation reaction thereby producing cellulose powder, while not affecting the polyester fiber.

Cellulose polymers typically comprise D-glucose repeating units with each D-glucose repeating unit comprising three hydroxyl groups at the C2, C3, and C6 carbons of the D-glucose. The C6-hydroxyl group of D-glucose is known to be more reactive than the C2- or C3-hydroxyls. It is found that C6-hydroxyl groups can be oxidized into aldehyde or carboxyl groups, which can further react with other chemicals. In previous studies, multiple oxidation methods have been applied to oxidize C6-hydroxyl groups, such as TEMPO/laccase, and TEMPO/NaClO/NaBr oxidant systems.

Figure 2:
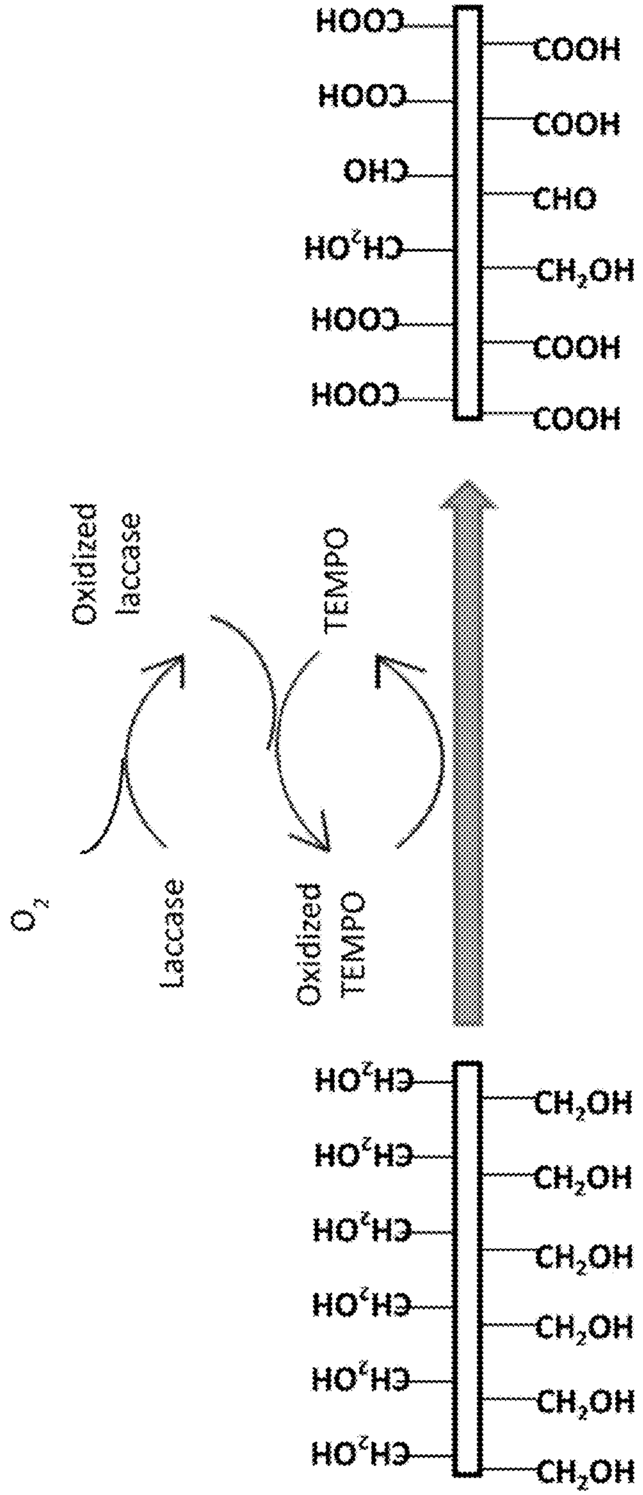
FIG. 2 depicts a schematic illustration showing the oxidation of a cellulose polymer using laccase/TEMPO as the oxidant according to certain embodiments described herein.
Figure 3:
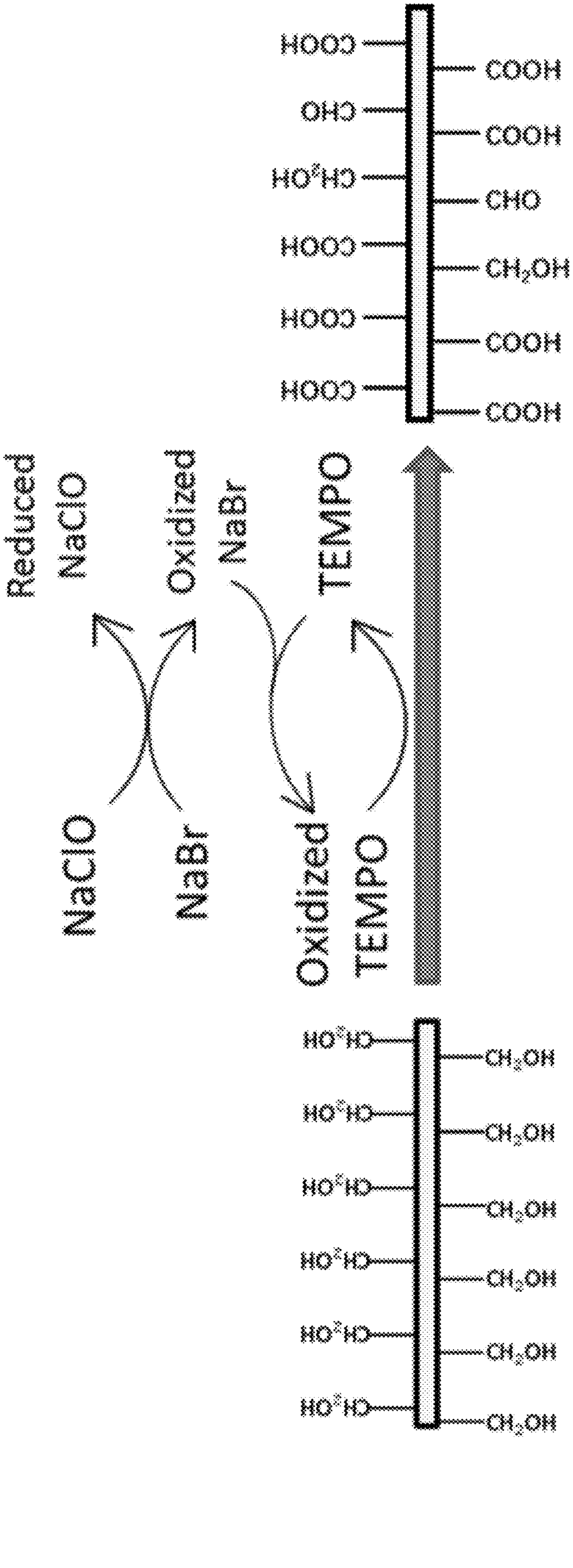
FIG. 3 depicts a schematic illustration showing the oxidation of a cellulose polymer using NaClO/NaBr/TEMPO as the oxidant according to certain embodiments described herein.
Figure 4A:
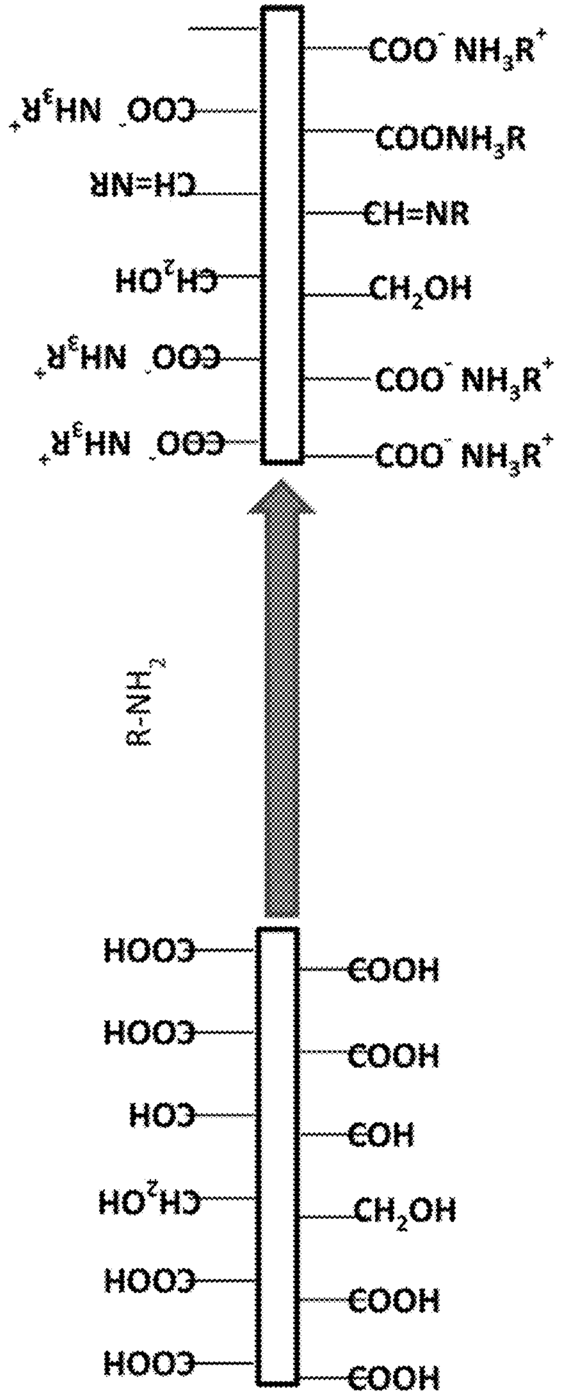
FIG. 4A depicts a schematic illustration showing amine functionalization of C6-aldehyde containing oxidized cellulose polymers according to certain embodiments described herein.
Figure 4B:
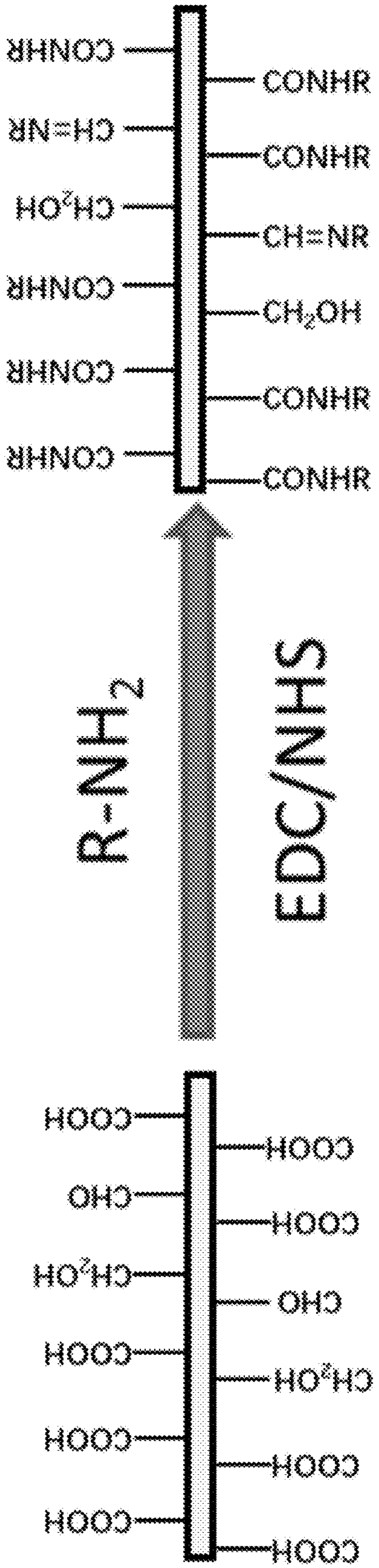
FIG. 4B depicts a schematic illustration showing amine functionalization of C6-carboxylic acid containing cellulose polymers in presence of EDC/NHS coupling agent according to certain embodiments described herein.

The oxidation of the cellulose polymer using TEMPO/laccase and TEMPO/NaClO/NaBr oxidant systems is depicted pictorially in FIGS. 2 and 3, respectively and show the oxidation of the C6-hydroxyl groups to aldehydes and carboxylic acids. Unreacted C6-hydroxyl groups may also be present in the product as depicted in FIGS. 2 and 3.

The TEMPO/laccase and TEMPO/NaClO/NaBr oxidant systems may produce oxidized cellulose polymers comprising a mixture of glucose repeating units having C6-alhyde and C6-carboxylic acid functional groups as shown in FIGS. 2 and 3. The ratio of C6-aldehyde glucose repeating units to C6-carboxylic acid glucose repeating units can vary depending on the oxidation reaction conditions and reagent stoichiometry. The selection of the ratio of C6-aldehyde glucose repeating units to C6-carboxylic acid glucose repeating units is well within the skill of a person of ordinary skill in the art.

The oxidation reaction may be conducted in any solvent. Exemplary solvents include, but are not limited to, alkyl halides, ethers, and water. In certain embodiments, the oxidation reaction is conducted in water.

The oxidant may be any oxidant known in the art that is able to oxidize primary alcohols to an aldehyde or carboxylic acid. Such oxidants are well known in the art and the selection of which is well within the skill of a person of ordinary skill in the art. In certain embodiments the oxidant comprises laccase and (2,2,6,6-tetramethylpiperidin-1-yl) oxyl (TEMPO); or NaClO, TEMPO, and NaBr.

The concentration of the cellulose polymer in the oxidation reaction can be up to 50% by weight. In certain embodiments, the concentration of the cellulose polymer in the oxidation reaction may be between 0.5-20% wt; 0.5-15% wt; or 0.5-10% wt.

The laccase/TEMPO oxidation reaction can be conducted at 20-60° C. In certain embodiments, the laccase/TEMPO oxidation reaction can be conducted at 20-60° C.; 25-60° C.; 30-60° C.; 30-55° C.; 30-50° C.; 30-45° C.; 35-45° C.; or 40-45° C.

The concentration of the cellulose polymer in the laccase/TEMPO oxidation reaction solution may be 0.1-5% wt. In certain embodiments, the concentration of the cellulose polymer in the oxidation reaction may be between 0.1-4% wt; 0.1-3% wt; 0.1-2.5% wt; 0.1-2% wt; 0.5-2% wt; 1-2% wt; or 1.5-2% wt.

The concentration of the laccase in the laccase/TEMPO oxidation reaction solution may be 0.1-10% wt. In certain embodiments, the concentration of the laccase in the laccase/TEMPO oxidation reaction solution may range from 0.1-9% wt; 0.1-8% wt; 0.1-7% wt; 0.1-6% wt; 0.1-5% wt; 0.1-4% wt; 0.1-3% wt; 0.1-2% wt; 0.1-1% wt; 1-9% wt; 2-9% wt; 3-9% wt; 4-9% wt; 6-9% wt; 7-9% wt; 8-9% wt; 1-9% wt; 2-8% wt; 3-7% wt; or 4-6% wt.

The concentration of the TEMPO in the laccase/TEMPO oxidation reaction solution may range from 0.1-10% wt. In certain embodiments, the concentration of the TEMPO in the laccase/TEMPO oxidation reaction solution may range from 0.1-9% wt; 0.1-8% wt; 0.1-7% wt; 0.1-6% wt; 0.1-5% wt; 0.1-4% wt; 0.1-3% wt; 0.1-2% wt; 0.1-1% wt; 1-9% wt; 2-9% wt; 3-9% wt; 4-9% wt; 6-9% wt; 7-9% wt; 8-9% wt; 1-9% wt; 2-8% wt; 3-7% wt; or 4-6% wt.

The NaClO/TEMPO/NaBr oxidation reaction can be conducted at 20-60° C. In certain embodiments, the laccase/TEMPO oxidation reaction can be conducted at 20-60° C.; 20-55° C.; 20-50° C.; 20-45° C.; 25-45° C.; 30-45° C.; or 35-45° C.

The concentration of the cellulose polymer in the NaClO/TEMPO/NaBr oxidation reaction solution may be 0.1-20% wt. In certain embodiments, the concentration of the cellulose polymer in the NaClO/TEMPO/NaBr oxidation reaction may be between 0.1-19% wt; 0.1-18% wt; 0.1-17% wt; 0.1-16% wt; 0.1-15% wt; 0.1-14% wt; 0.1-13% wt; 0.1-12% wt; 0.1-11% wt; 0.1-10% wt; 1-10% wt; 2-10% wt; 3-10% wt; 4-10% wt; 5-10% wt; 6-10% wt; 7-10% wt; or 8-10% wt.

The concentration of the NaClO in the NaClO/TEMPO/NaBr oxidation reaction solution may range from 0.1-10% wt. In certain embodiments, the NaClO is present in the NaClO/TEMPO/NaBr oxidation reaction solution at a concentration between 1-10% wt; 2-10% wt; 3-10% wt; 4-10% wt; 5-10% wt; 6-10% wt; 7-10% wt; 8-10% wt; 1-9% wt; 1-8% wt; 1-7% wt; 1-6% wt; 1-5% wt; 1-4% wt; 1-3% wt; 1-2% wt; 2-8% wt; or 3-6% wt.

The concentration of the TEMPO in the NaClO/TEMPO/NaBr oxidation reaction solution may range from 0.01-0.1% wt. In certain embodiments, the TEMPO is present in the NaClO/TEMPO/NaBr oxidation reaction solution at a concentration between 0.01-0.1% wt; 0.02-0.1% wt; 0.03-0.1% wt; 0.04-0.1% wt; 0.05-0.1% wt; 0.06-0.1% wt; 0.07-0.1% wt; 0.08-0.1% wt; 0.09-0.1% wt; 0.01-0.09% wt; 0.01-0.08% wt; 0.01-0.07% wt; 0.01-0.06% wt; 0.01-0.05% wt; 0.01-0.04% wt; 0.01-0.03% wt; 0.01-0.02% wt; 0.02-0.09% wt; 0.03-0.08% wt; 0.04-0.07% wt; or 0.05-0.06% wt.

The concentration of the NaBr in the NaClO/TEMPO/NaBr oxidation reaction solution may range from 0.1-1% wt. In certain embodiments, the NaBr is present in the NaClO/TEMPO/NaBr oxidation reaction solution at a concentration between 0.2-1% wt; 0.3-1% wt; 0.4-1% wt; 0.5-1% wt; 0.6-1% wt; 0.7-1% wt; 0.8-1% wt; 0.9-1% wt; 0.1-0.9% wt; 0.1-0.8% wt; 0.1-0.7% wt; 0.1-0.6% wt; 0.1-0.5% wt; 0.1-0.4% wt; 0.1-0.3% wt; 0.1-0.2% wt; 0.2-0.9% wt; 0.3-0.8% wt; 0.4-0.7% wt; or 0.5-0.6% wt.

In certain embodiments, the laccase/TEMPO oxidation is conducted as follows: The laccase solution (0.1-10% wt. %) is prepared by dissolving in sodium acetate (pH=5.5), then add in TEMPO powder (0.1-10% wt. %) and mix well. Before adding the cotton textile into the laccase/TEMPO solution, the cotton textile is desized by detergent. After then, add the cotton textile (0.5%-2%) into the mixed solution and stir at temperature of 25° C.-40° C. for 24-72 hours. After reaction, the textile is purified by DI and ethanol for 3 times each. Then dried under ambient conditions, as shown in FIG. 2.

In certain embodiments, the NaClO/NaBr/TEMPO oxidation is conducted as follows: Prepare the NaBr/TEMPO solution by mixing TEMPO (0.01-0.1% wt. %) and NaBr (0.1-1% wt. %) in DI. Before adding the cotton textile into the NaBr/TEMPO solution, the cotton textile is desized by detergent. After then, add the cotton textile (5%-10%) into the mixed solution and soak at room temperature (25° C.) for 1 hour. Then add NaClO solution (0.1-10 wt. %) into the solution and mix well. The pH of the solution is adjusted by 0.1M NaOH to 10.5-11.5. The reaction solution is then stirred at room temperature for 4 hours. Ethanol (3% wt. %) is then added to quench the reaction. The resulting mixture is then added to 0.1M HCl to neutralize the solution. The oxidized fabrics are washed with deionized water 3 times and dried under ambient conditions, as shown in FIG. 3.

After oxidation, C6-hydroxyl groups within the cellulose are converted to aldehyde groups and/or carboxylate groups, which can then be reacted with amine-containing chemicals via grafting reaction. As a result, the surface of cellulosic fabrics is covalently bonded with amine groups. The resulting amine-functionalized cellulosic textile can form strong bonds with $CO_2$ at ambient air under anhydrous or under humid conditions and can thus be used to directly capture $CO_2$ from ambient air.

In instances in which $R^3$ is —CHO, the oxidized cellulose polymer undergoes amine condensation reactions in the presence of the polyalkylenimine or the alkylsilane to form Schiff base products.

The amine condensation reaction can be conducted in any polar solvent. Exemplary solvents include alkyl halides, ether, alcohols, and water. In certain embodiments, the amine condensation reaction is conducted in water.

The amine condensation reaction can be conducted at 20-80° C. In certain embodiments, the amine condensation reaction can be conducted at 20-75° C.; 20-70° C.; 20-65° C.; 20-60° C.; 25-60° C.; 30-60° C.; 30-55° C.; 30-50° C.; 30-45° C.; 35-45° C.; or 40-45° C.

The concentration of the oxidized cellulose polymer in the amine condensation reaction may be 0.1%-30%.

The concentration of the polyalkylenimine in the amine condensation reaction may be between 1-30% wt. In certain embodiments, the concentration of the polyalkylenimine in the amine condensation reaction is between 1-25% wt; 1-20% wt; 1-15% wt; 1-10% wt; 2-10% wt; 3-10% wt; 4-10% wt; 5-10% wt; 6-10% wt; 7-10% wt; 8-10% wt; 2-9% wt; 3-8% wt; or 4-7% wt. Advantageously, if the concentration of the polyalkylenimine is maintained between 1-10%, the amount of discoloring of the resulting amine-functionalized cellulose polymer can be minimized while still maintaining effective $CO_2$ capture performance. Discoloration of the treated cellulose polymer may not be desirable in certain applications requiring uncolored products.

In instances in which $R^3$ is —$CO_2H$, the oxidized cellulose polymer undergoes amine coupling reactions in the presence of the polyalkylenimine or the alkylsilane and a coupling agent. The coupling agent may optionally comprise a coupling agent additive and/or a base.

The amine coupling reaction can be conducted in any polar solvent. Exemplary solvents include alkyl halides, ether, alcohols, and water. In certain embodiments, the amine condensation reaction is conducted in water.

The amine coupling reaction can be conducted at 0-80° C. In certain embodiments, the amine condensation reaction can be conducted at 0-75° C.; 0-70° C.; 0-65° C.; 0-60° C.; 10-60° C.; 20-60° C.; 20-55° C.; 20-50° C.; 20-45° C.; 20-45° C.; 20-40° C.; 20-35° C.; 20-30° C. or; 20-25° C.

The coupling agent can be a carbodiimide, such as DCC, DIC, EDC, CIC, BMC, CPC, BDDC, PIC, PEC, and BEM, a uranium/aminium salt, such as HATU, HBTU, TATU, TBTU, HAPyU, TAPipU, HAPipU, HBPipU, HAMBU, HBMDU, HAMTU, 5,6-B(HATU), 4,5-B(HATU), HCTU, TCTU, and ACTU, phosphonium salts, such as AOP, BOP, PyAOP, PyBOP, PyOxm, PyNOP, PyFOP, NOP, and PyClock, immonium salts, such as BOMI, BDMP, BMMP, BPMP, and AOMP.

The coupling agent additive can be any coupling agent additive known in the art, such as HOBt. 6-$NO_2$-HOBt, 6-Cl-HOBt, 6-$CF_3$-HOBt, HOAt, HODhbt, HODhat, HOSu (NHS), and Oxyma.

The concentration of the oxidized cellulose polymer in the amine coupling reaction may be 0.1%-30%.

The concentration of the polyalkylenimine in the amine coupling reaction may be between 1-30% wt. In certain embodiments, the concentration of the polyalkylenimine in the amine coupling reaction is between 1-25% wt; 1-20% wt; 1-15% wt; 1-10% wt; 2-10% wt; 3-10% wt; 4-10% wt; 5-10% wt; 6-10% wt; 7-10% wt; 8-10% wt; 9-10% wt; 2-9% wt; 3-7% wt; or 4-6% wt. If the concentration of the polyalkylenimine is maintained between 1-10%, the amount of discoloring of the resulting amine-functionalized cellulose polymer can be minimized while still maintaining effective $CO_2$ capture performance.

The concentration of the coupling agent in the amine coupling reaction may be between 1-20% wt. In certain embodiments, the concentration of the polyalkylenimine in the amine coupling reaction is between 1-15% wt; 1-10% wt; 2-10% wt; 2-9% wt; 2-8% wt; 3-10% wt; 4-10% wt; 5-10% wt; 6-10% wt; 7-10% wt; 8-10% wt; 9-10% wt; 2-9% wt; 3-8% wt; 4-7% wt; or 5-6% wt.

The concentration of the coupling agent additive in the amine coupling reaction may be between 1-20% wt. In certain embodiments, the concentration of the polyalkylenimine in the amine coupling reaction is between 1-15% wt; 1-10% wt; 2-10% wt; 2-9% wt; 2-8% wt; 3-10% wt; 4-10% wt; 5-10% wt; 6-10% wt; 7-10% wt; 8-10% wt; 9-10% wt; 2-9% wt; 3-8% wt; 4-7% wt; or 5-6% wt.

In certain embodiments, the amine-containing chemical is added to the oxidized cellulose polymer and allowed to react with stirring at room temperature for 24 hours. After the reaction, the amine-functionalized cellulose textile can be purified with ethanol and DI for three times each. After purification, the textile is dried in ambient air.

The $CO_2$ adsorption properties of the amine-functionalized cellulose polymer may be added to any type of substrate, e.g., a textile substrate, by applying a surface finishing solution comprising the amine-functionalized cellulose polymer, e.g., in powder form, a binder, and optionally water, to the substrate thereby forming a surface finishing solution treated substrate, and optionally curing the surface finishing solution treated substrate.

The surface finishing solution can be prepared by combining the amine-functionalized cellulose polymer, the binder, and optionally water. In certain embodiments, the amine-functionalized cellulose polymer is in powder form.

The concentration of amine-functionalized cellulose polymer in the surface finishing solution can range from 1-10 g/L. The concentration of the binder in the surface finishing solution can be 50-250 g/L with a solid content of 20-40 wt %. The surface finishing solution can be prepared by mixing a mixture comprising the amine-functionalized cellulose polymer, binder, and optionally water in high speed homogenizer at 5000-20000 RPM for 1-30 mins.

Any binder known in the art can be used in connection with the methods described herein. In certain embodiments, the binder is a commercial water based binder commonly used for pad-dry-cure process. Binders can be acrylic-based, butadiene-based, or polyurethane-based. Exemplary binders, include, but are not limited to Dow Primal™ ECO-1291, Dow Rhoplex R-3349, Achitex Minerva Mineprint Binder ACM, Michelman® 4983-40R, and Achitexminerva Binder WST. Exemplary polyurethane-based binders include, but are not limited to, Tanatex Baygard® FBI and Bondthane™ UD-303. In certain embodiments, the binder is an acrylic-based binder.

Application of the surface finishing solution to a substrate can be accomplished using any method known in the art. In certain embodiments, Application of the surface finishing solution to a substrate can be accomplished by dip coating or by the pad-drying. Dip coating the substrate in the surface finishing solution can be performed for 1-10 minutes. Padding can be conducted by adjusting pressing pressure and roller speed. The roller speed can be between 1-5 m/min and the roller nip pressure can be between 1-5 bar.

Depending on the properties of the binder used in the surface finishing solution, it may be necessary to cure the surface finishing solution treated substrate. Curing can be conducted at any temperature between room temperature and 180° C. In certain embodiments, curing is conducted at a temperature of 50 to 160° C.; 100 to 160° C.; or 120 to 160° C.

EXAMPLES

Example 1 Lab-Scale Production of Oxidized Cotton Textile Via Laccase/TEMPO Oxidation The cotton textile was cut into square shape with diameter of 4 cm, and then it was washed and desized by detergent and dried at ambient air before further modification. The laccase solution (0.1-10% wt. %) is prepared by dissolving in an aqueous solution of sodium acetate (50 mM, pH=5.5), then add in TEMPO powder (0.1-10% wt. %) and mix well. The dried washed cotton textile (0.5%-2%) was added into the mixed solution and stir at temperature of 25° C.-40° C. for 24-72 hours. The modified cotton textile was isolated by filtration, washed with three portions of deionized water, and allowed to dry under ambient conditions.

Example 2 Production of Oxidized Cotton Textile Via NaClO/NaBr/TEMPO Oxidation The cotton textile was cut into square shape with diameter of 4 cm, and then it was washed and desized by detergent and dried at ambient air before further modification. Prepare the NaBr/TEMPO solution by mixing TEMPO (0.01-0.1% wt. %) and NaBr (0.1-1% wt. %) in deionized water. The washed desized cotton textile (5%-10%) was added into the mixed solution and soak at room temperature (25° C.) for 1 hour. Then NaClO solution (0.1-10 wt. %) was added into the solution adjust the pH of the solution to 10.5-11.5 by 0.1M NaOH. After then, the reaction solution was stirred at room temperature for 4 hours. After the reaction, ethanol (3% wt. %) was added into the solution to stop the reaction. The modified cotton textile was isolated by filtration, washed with three portions of deionized water, and allowed to dry under ambient conditions.

Example 3 Amine-Functionalized Cotton Textile Modified by Laccase-TEMPO Oxidation and Polyethyleneimine Grafting without Crosslinker/Catalyst After oxidation with the method described in Example 1, the textile is dried at ambient air first before further reacting with a polyalkylenimine, such as polyethylenimine (2%-10% wt.) or an alkylsilane (2%-10% wt.). Then the polyalkylenimine or the alkylsilane is added to the oxidized textile in water and allowed to react with stirring at room temperature for 24 hours. The amine-functionalized cellulose textile was then washed with three portions of ethanol and three portions of deionized water and allowed to dry under ambient conditions.

Example 4 Amine-Functionalized Cotton Textile Modified by NaClO/NaBr/TEMPO Oxidation and Polyethyleneimine Grafting without Crosslinker/Catalyst After oxidation with the method described in Example 2, the textile is allowed to dry under ambient conditions before further reacting with a polyalkylenimine, such as polyethylenimine or an alkylsilane. Then the polyalkylenimine or polyethylenimine (2%-10% wt.) or an alkylsilane (2%-10% wt.) is added to the oxidized textile in water and allowed to react with stirring at room temperature for 24 hours. The amine-functionalized cellulose textile was then washed with three portions of ethanol and three portions of deionized water and allowed to dry under ambient conditions.

Example 5 Amine-Functionalized Cotton Textile Modified by Laccase-TEMPO Oxidation and Polyethyleneimine Grafting with Crosslinker/Catalyst After oxidation with the method described in Example 1, the textile is dried at ambient air first before further reacting with amine-containing chemicals, such as polyethylenimine (2%-10%). Then amine-containing chemical is added to the oxidized textile in water, then N-(3-(dimethylamino) propyl)-N'-ethylcarbodiimide hydrochloride (EDC) (2%-8%) and of N-hydroxysuccinimide (NHS) (2%-8%) were added into the reacting solution, and allowed to react with stirring at room temperature for 24 hours. The amine-functionalized cellulose textile was then washed with three portions of ethanol and three portions of deionized water and allowed to dry under ambient conditions.

Example 6 Amine-Functionalized Cotton Textile Modified by NaClO/NaBr/TEMPO Oxidation and Polyethyleneimine Grafting without Crosslinker/Catalyst After oxidation with the method described in Example 2, the textile is dried at ambient air first before further reacting with amine-containing chemicals, such as polyethylenimine (2%-10%). Then amine-containing chemical is added to the oxidized textile in water, then N-(3-(dimethylamino) propyl)-N'-ethylcarbodiimide hydrochloride (EDC) (2%-8%) and of N-hydroxysuccinimide (NHS) (2%-8%) were added into the reacting solution, and allowed to react with stirring at room temperature for 24 hours. The amine-functionalized cellulose textile was then washed with three portions of ethanol and three portions of deionized water and allowed to dry under ambient conditions.

Example 7 Production of Amine-Functionalized Cotton Yarn in Dyeing Machine (Large Scale Production)

Figure 10:
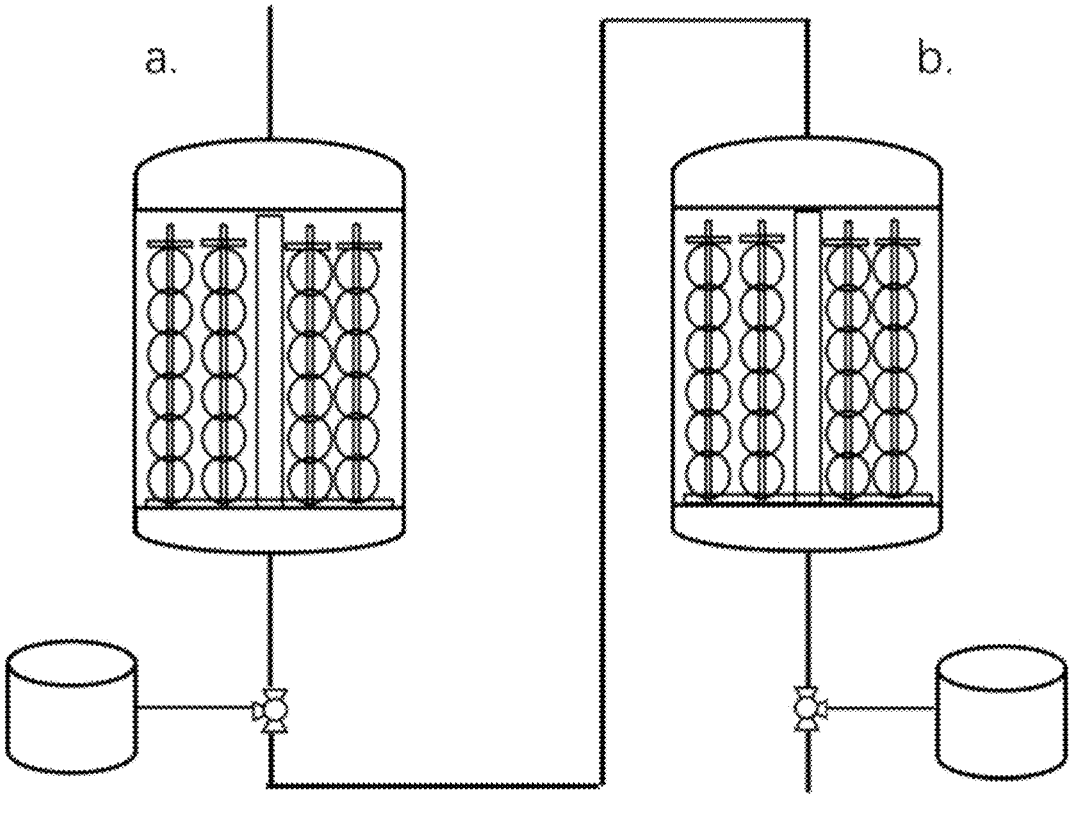
FIG. 10 depicts a schematic diagram showing an exemplary system for preparing the amine-functionalized cotton yarn described herein. Component (a) is for oxidation of cellulosic materials, and component (b) is for grafting reaction of amine-containing moiety onto cellulosic materials.
Figure 11:
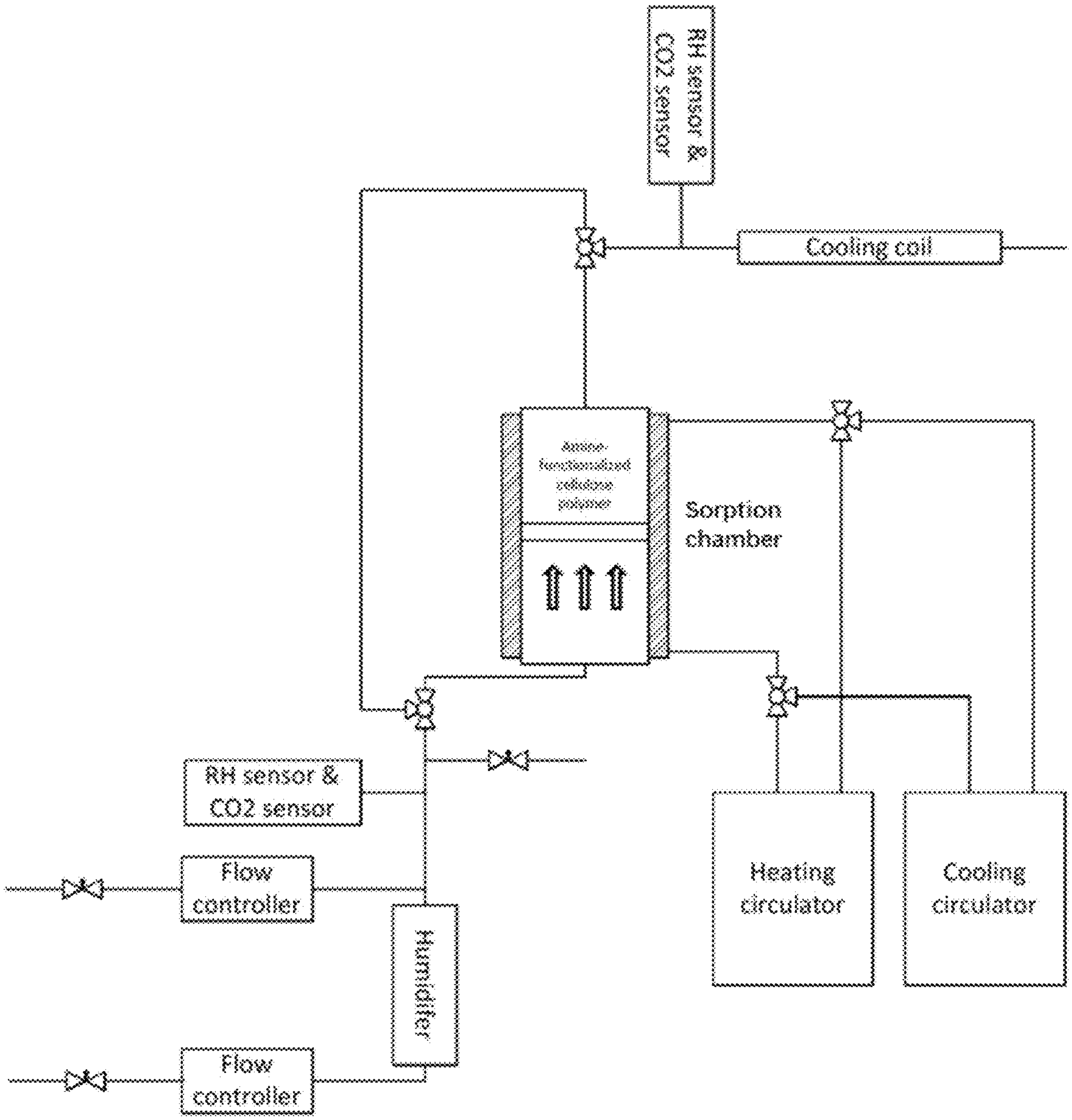
FIG. 11 depicts a schematic diagram showing the major components of an exemplary system for controllable $CO_2$ sorption using the amine-functionalized cellulose polymers described herein.
Figure 12:
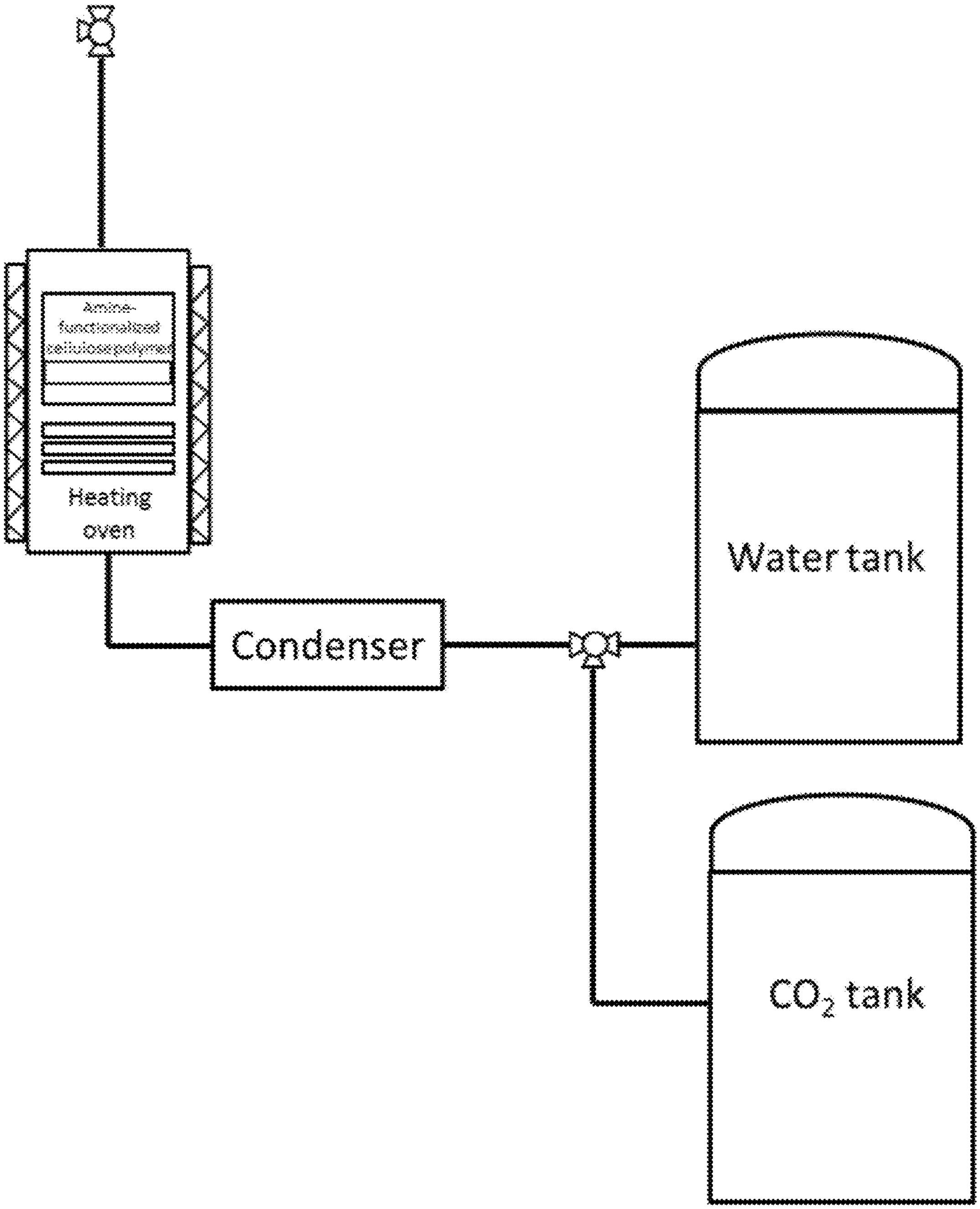
FIG. 12 depicts a schematic diagram showing the major components of an exemplary system for controllable $CO_2$ desorption and collection comprising the amine-functionalized cellulose polymer described herein.

In order to realize large-scale production, a yarn dyeing machine is applicable for scaled-up enzymatic reaction and amine grafting of yarns in a batch-to-batch mode. As shown in FIG. 10, the system is composed of two dyeing machines. In the first one, the cotton yarn can be oxidized by multiple oxidation methods.

Example 8. Amine-Functionalized Cellulose Polymer Formulation for Surface Finish for Textile Cellulose powder can be oxidized by either laccase/TEMPO or NaClO/NaBr/TEMPO based on the description in Example 1 and Example 2. Oxidized cellulose powder then reacts with amine-containing moiety and produces amine-functionalized cellulosic powder. The modified powder is then formulated into composite formulation with selected binders. Concentrations of cellulose are 1-10 g/L. Type of binders such as acrylic, butadiene-based, polyurethane based are preferred. Commercial binders (50-250 g/L) of binder solution with solid content of 20-40 wt % are added. High speed homogenizer at 5000-20000 RPM for 1-30 mins.

Application of the prepared dispersion onto cellulosic fabrics is either by employing dip coating or by the paddry-cure process. Dip coating fabric in the solution bath is to be performed for 1-10 minutes. Padding is to be conducted by adjusting pressing pressure and roller speed. Heating and curing temperature is performed at 100-160° C. for 1-10 minutes.

Figure 9:
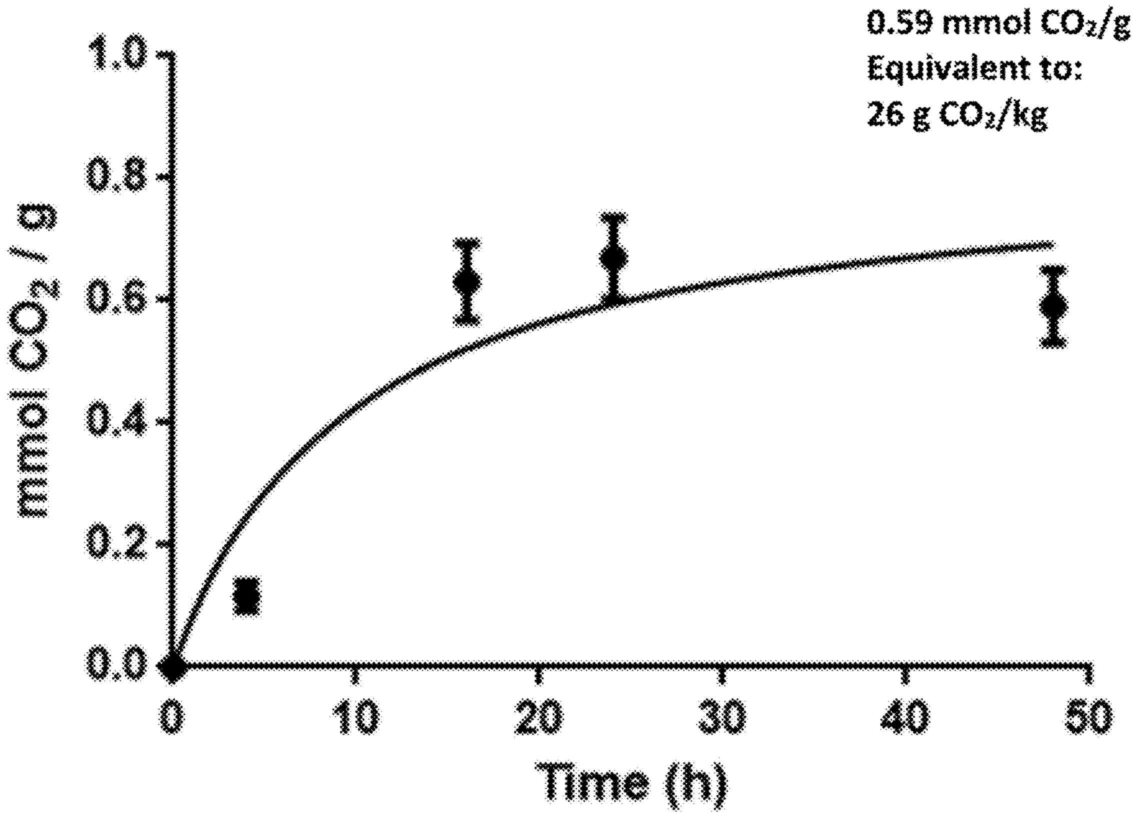
FIG. 9 depicts experimental sorption isotherms of $CO_2$ by PEI-functionalized cotton fabric at 25° C., 60% relative humidity, and ambient $CO_2$ concentration of 400 ppm.

Example 9 $CO_2$ Sorption Test Conducted by Amine Functionalized Cotton Textile After amine functionalization of the cotton fabric, the modified textile was tested for $CO_2$ adsorption as follows: 0.5 g square-shaped textile with side length of 40 mm is places into an adsorption column having a diameter of 100 mm and a height of 300 mm. Prior to $CO_2$ adsorption, the textile was desorbed at 90° C. for 60 min, and the original weight of the textile was recorded. For subsequent $CO_2$ adsorption, certain flow of air (0.5 L/min-5 L/min) containing certain level of $CO_2$ (>400 ppm), with a relative humidity of 60% were streamed through the adsorption column at temperature of 30° C. After certain adsorption time (12-48 hours), the mass of the textile becomes stable. The mass difference before and after the adsorption was recorded in order to calculate the adsorption capacity of the fabric (FIG. 9 and Table 1).

Example 10 $CO_2$ Desorption Test and Reusability of Amine Functionalized Fabric: Separated Oven In order to measure the desorption ability and reusability of the amine functionalized fabric, the saturated textile was conducted desorption under conditions as follows: the textile is desorbed at 90° C. for certain period of time (30 min-60 min) in a flow of humidified nitrogen (Table 2).

Figure 13:
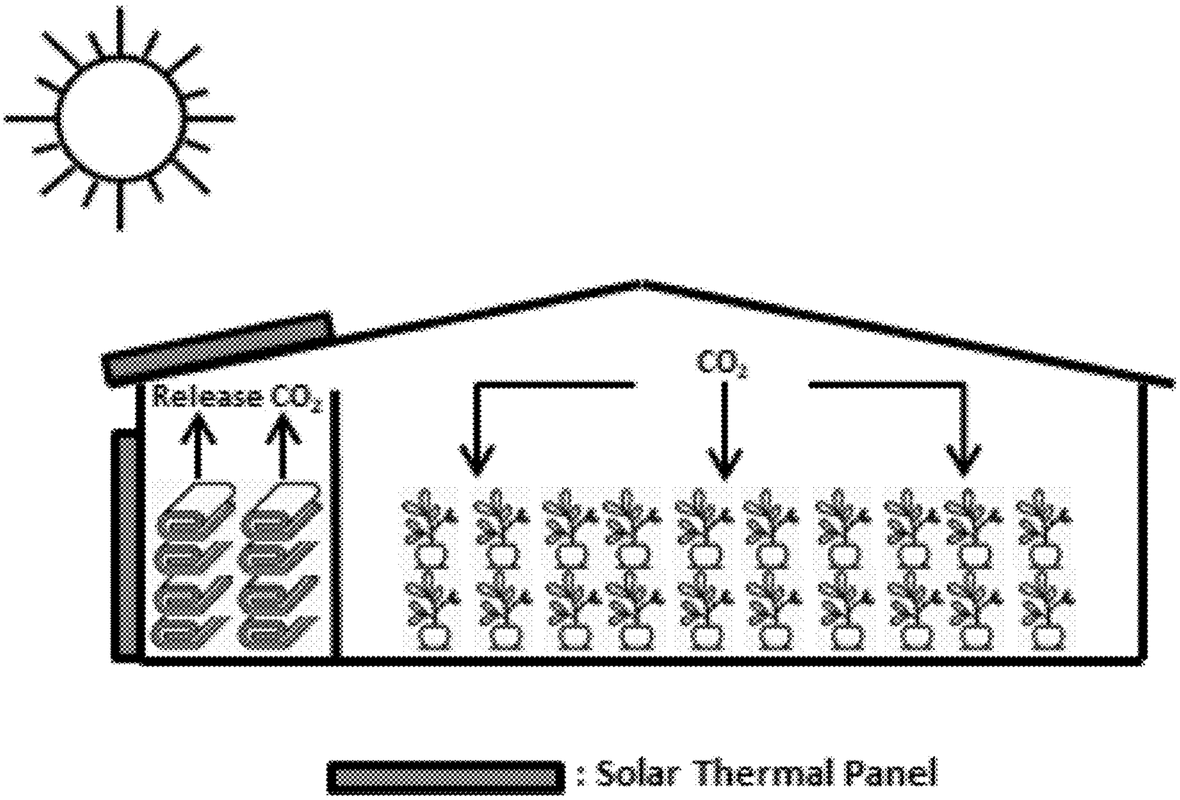
FIG. 13 depicts a schematic diagram showing $CO_2$ release from the amine-functionalized cellulose polymer $CO_2$ conjugate described herein facilitated by heat provided by a solar thermal panel in a greenhouse.

Example 11 $CO_2$ Desorption Test and Reusability of Amine Functionalized Fabric: Direct Application of Desorbed $CO_2$ in Greenhouse In order to measure the desorption ability and reusability of the amine functionalized fabric, the saturated textile was conducted desorption under condition as follows: the textile is desorbed in greenhouse by heating, and the energy is provided by solar thermal panel. $CO_2$ gas released from the amine functionalized textile can then be utilized by plants as the raw material of photosynthesis, as shown in FIG. 13.

What is claimed:

1. A method of preparing an amine-functionalized polymer comprises: contacting a cellulose polymer comprising a repeating unit of Formula 2:

2

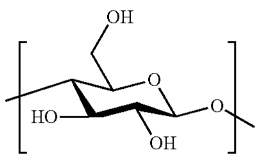

with an oxidant comprising (i) 0.1-10% wt laccase and 0.1-10% wt (2,2,6,6-tetramethylpiperidin-1-yl)oxyl (TEMPO), wherein the cellulose polymer is present at a concentration of 0.5-2.0% wt, or (ii) 0.1-1% wt NaBr, 0.01-0.1% wt TEMPO, and 0.1-10% wt NaClO, wherein the cellulose polymer is present at a concentration of 5-10% wt, thereby forming an oxidized cellulose polymer comprising a repeating moiety of Formula 3:

3

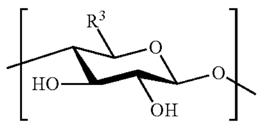

or a conjugate salt thereof, wherein $R^3$ is —$CO_2H$ or —CHO;

contacting the oxidized cellulose polymer with a polyalkylenimine or an alkylsilane, with the proviso that when $R^3$ is —$CO_2H$, a coupling agent is also present during the step of contacting the oxidized cellulose polymer with the polyalkylenimine or the alkylsilane; and thereby forming an amine-functionalized polymer comprising a repeating unit of Formula 1:

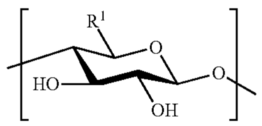

or a conjugate salt thereof, wherein $R^1$ is —(C═O)NH$R^2$ or —H(C═N—$R^2$); and $R^2$ is a polyalkylenimine or an alkylsilane.

2. The method of claim 1, wherein the cellulose polymer is in the form of a cellulose powder or a textile.

3. The method of claim 1, wherein the cellulose polymer is present at a concentration of 0.5-10% wt.

4. The method of claim 1, wherein the polyalkylenimine is selected from the group consisting of PEI, TEPA, DETA, and PEHA.

5. The method of claim 1, wherein the polyalkylenimine is present at a concentration of 2-10% wt.

6. The method of claim 5, wherein —$R^3$ is $CO_2H$ and the coupling agent comprises N-(3-(dimethylamino) propyl)-N'-ethylcarbodiimide hydrochloride (EDC) and N-hydroxysuccinimide (NHS).

7. The method of claim 6, wherein EDC is present at a concentration of 2-8% by wt; and NHS is present at a concentration of 2-8% by wt.

8. The method of claim 1, wherein $R^3$ is —CHO; the step of contacting the cellulose polymer with the oxidant is conducted at 35-45° C., wherein the cellulose polymer is present at a concentration of 0.5-2.0% wt; the oxidant comprises laccase and TEMPO, wherein the laccase is present at a concentration of 0.1-10% wt; and TEMPO is present at a concentration of 0.1-10% wt; and the step of contacting the oxidized cellulose polymer with the polyalkylenimine is conducted at 20-40° C., wherein the polyalkylenimine is PEI and the PEI is present at a concentration of 2-10% wt.

9. The method of claim 1, wherein $R^3$ is —$CO_2H$; the step of contacting the cellulose polymer with the oxidant is conducted at 24-40° C., wherein the cellulose polymer is present at a concentration of 5-10% wt; the oxidant comprises NaClO, TEMPO, and NaBr, wherein NaBr is present at a concentration of 0.1-1% wt; TEMPO is present at a concentration of 0.01-0.1%; and NaClO is present at a concentration of 0.1-10% wt; and the step of contacting the oxidized cellulose polymer with the polyalkylenimine is conducted at 20-27° C., wherein the polyalkylenimine is PEI and the coupling agent comprises EDC and NHS, wherein PEI is present at a concentration of 2-10% wt; EDC is present at a concentration of 2-8% by wt; and NHS is present at a concentration of 2-8% by wt.

10. The method of claim 1, wherein the polyalkylenimine or the alkylsilane crosslink two or more repeating units of Formula 1.

11. The method of claim 1, further comprises contacting the amine-functionalized polymer with $CHO(CH_2)_n CH_2CHO$, wherein n is a whole number selected between 2-6.

12. The method of claim 1, wherein the method further comprises the steps of combining the amine-functionalized polymer with a binder thereby forming a surface finishing solution; contacting a textile with the surface finishing solution thereby forming a surface finishing solution treated textile; and optionally curing the surface finishing solution treated textile, wherein the cellulose polymer is in the form of a cellulose powder.

13. A surface finishing solution treated textile prepared by the method of claim 12.

* * * * *